(12) United States Patent
Nam

(10) Patent No.: US 12,141,545 B2
(45) Date of Patent: Nov. 12, 2024

(54) CALCULATION CIRCUIT AND DEEP LEARNING SYSTEM INCLUDING THE SAME

(71) Applicant: SK hynix Inc., Icheon (KR)

(72) Inventor: Ji Hoon Nam, Icheon (KR)

(73) Assignee: SK hynix Inc., Icheon (KR)

( * ) Notice: Subject to any disclaimer, the term of this patent is extended or adjusted under 35 U.S.C. 154(b) by 1050 days.

(21) Appl. No.: 16/930,210

(22) Filed: Jul. 15, 2020

(65) Prior Publication Data

US 2021/0256360 A1    Aug. 19, 2021

(30) Foreign Application Priority Data

Feb. 18, 2020 (KR) .................. 10-2020-0019532

(51) Int. Cl.
*G06F 7/544* (2006.01)
*G06F 15/80* (2006.01)

(52) U.S. Cl.
CPC ........ *G06F 7/5443* (2013.01); *G06F 15/8046* (2013.01); *G06F 2207/3892* (2013.01)

(58) Field of Classification Search
CPC ........... G06F 7/5443; G06F 2207/3892; G06F 15/8046; G06F 17/16; G06N 3/06–063
See application file for complete search history.

(56) References Cited

U.S. PATENT DOCUMENTS

| | | | |
|---|---|---|---|
| 5,636,130 A | | 6/1997 | Salem et al. |
| 10,915,297 B1* | | 2/2021 | Halutz .................. G06F 17/153 |
| 2018/0336163 A1 | | 11/2018 | Phelps et al. |
| 2019/0026250 A1* | | 1/2019 | Das Sarma ........... G06F 7/5443 |

(Continued)

FOREIGN PATENT DOCUMENTS

| | | |
|---|---|---|
| BE | 576519 A | 7/1959 |
| CN | 107454966 A | 12/2017 |
| CN | 107533667 A | 1/2018 |
| CN | 107578095 A | 1/2018 |
| CN | 107918794 A | 4/2018 |

(Continued)

OTHER PUBLICATIONS

J. He, D. He, Y. Yang, J. Liu, J. Yang and S. Wang, "An LSTM Acceleration Engine for FPGAs Based on Caffe Framework," 2019 IEEE 5th International Conference on Computer and Communications (ICCC), Chengdu, China, 2019, pp. 1286-1292, doi: 10.1109/ICCC47050.2019.9064358. (Year: 2019).*

*Primary Examiner* — Andrew Caldwell
*Assistant Examiner* — Carlo Waje

(57) ABSTRACT

A calculation circuit may include a plurality of calculator groups constituting a systolic array composed of a plurality of rows and columns, wherein calculator groups included in each of the rows propagate a data value set through a single data path corresponding to the row in a data propagation direction, and propagate a plurality of drain value sets through a plurality of drain paths corresponding to the row in a drain propagation direction, and wherein a calculator group of the calculator groups included in each of the rows comprises a plurality of MAC (Multiplier-Accumulator) circuits, and the MAC circuits generate drain values respectively included in the drain value sets at the same time. The calculator groups included in each column may further propagate a weight value set corresponding to the column through a plurality of weight data paths corresponding to the column.

11 Claims, 22 Drawing Sheets

(56) References Cited

U.S. PATENT DOCUMENTS

2020/0026989 A1\* 1/2020 Zhang .................. G06N 3/04
2021/0097375 A1\* 4/2021 Huynh .................. G06F 7/50

FOREIGN PATENT DOCUMENTS

| | | |
|---|---|---|
| CN | 110610236 A | 12/2019 |
| CN | 110751277 A | 2/2020 |
| DE | 10 2004 016 196 A1 | 11/2005 |
| FR | 73245 E | 9/1960 |
| JP | H08-241294 A | 9/1996 |
| KR | 1020030011063 A | 2/2003 |
| KR | 10-2017-0126997 A | 11/2017 |
| KR | 10-2020-0011019 A | 1/2020 |
| WO | 2017/186830 A1 | 11/2017 |

\* cited by examiner

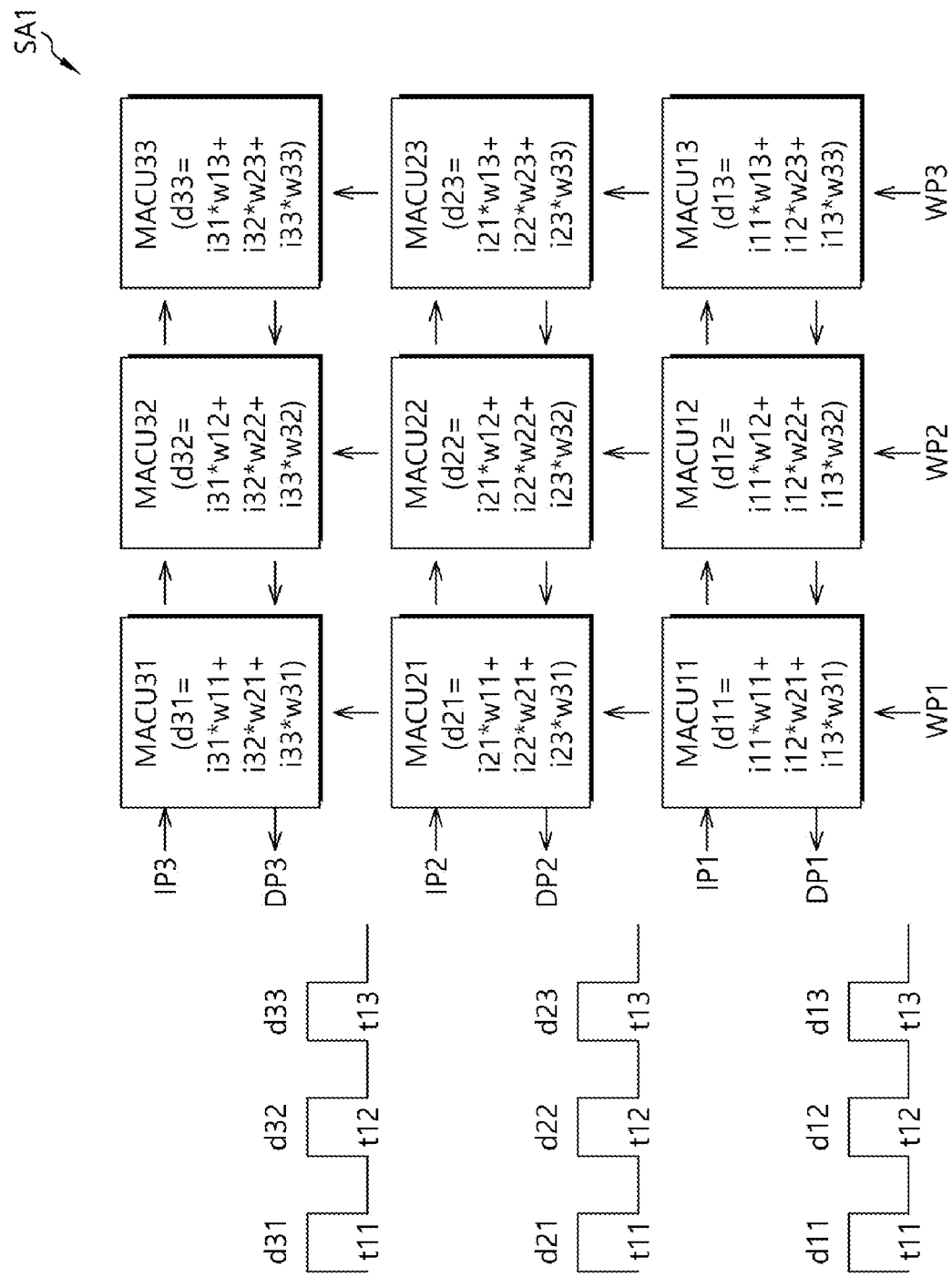

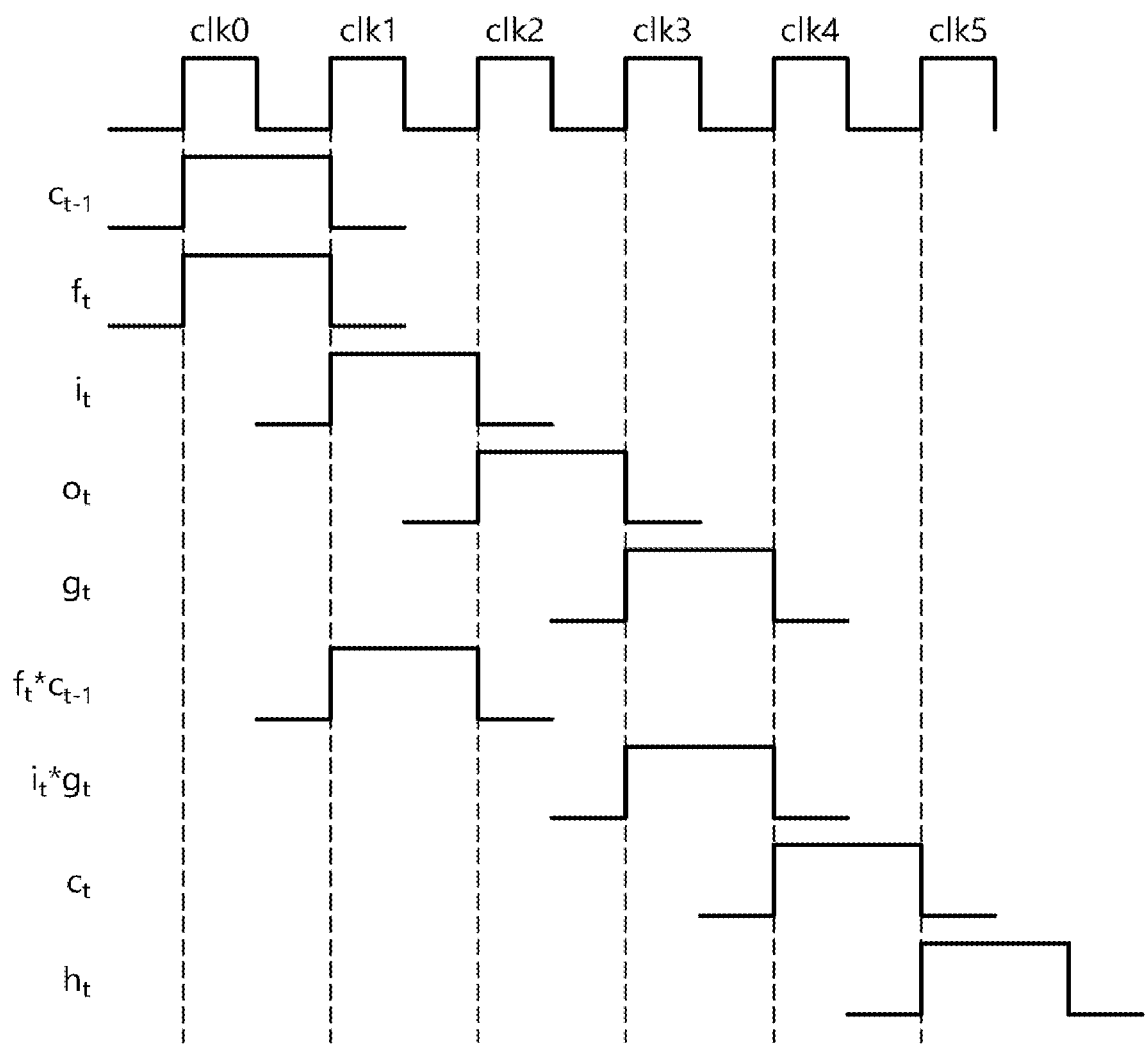

CALCULATION CIRCUIT AND DEEP LEARNING SYSTEM INCLUDING THE SAME

CROSS-REFERENCES TO RELATED APPLICATION

The present application claims priority under 35 U.S.C. § 119(a) to Korean application number 10-2020-0019532, filed on Feb. 18, 2020, in the Korean Intellectual Property Office, which is incorporated herein by reference in its entirety.

BACKGROUND

1. Technical Field

Various embodiments generally relate to a calculation circuit, and more particularly, to a calculation circuit including a MAC (Multiplier-Accumulator) circuit.

2. Related Art

A deep learning system for obtaining useful information by processing big data or large-scale data is a cutting-edge technology which is developing day by day to process more data at higher speed. The deep learning system may need a large number of MAC (Multiply-Accumulate) calculations which require a long calculation time and high power consumption. Therefore, the operation performance of a MAC operation circuit may be directly connected to the performance of the deep learning system.

SUMMARY

Various embodiments are directed to a calculation circuit which can operate with high operation efficiency and high hourly throughput, and a deep learning system including the same.

In an embodiment, a calculation circuit may include a plurality of calculator groups constituting a systolic array composed of a plurality of rows and columns, wherein calculator groups included in each of the rows propagate a data value set through a single data path corresponding to the row in a data propagation direction, and propagate a plurality of drain value sets through a plurality of drain paths corresponding to the row in a drain propagation direction, wherein a calculator group of the calculator groups included in each of the rows comprises a plurality of MAC (Multiplier-Accumulator) circuits, and the MAC circuits generate drain values respectively included in the drain value sets at the same time.

In an embodiment, a calculation circuit may include a plurality of calculator groups constituting a systolic array composed of a plurality of rows and columns, wherein calculator groups included in each of the rows are coupled through a single data path corresponding to the row, and wherein calculator groups included in each of the columns are coupled through a plurality of weight paths corresponding to the column.

In an embodiment, a deep learning system may include: a plurality of calculator groups constituting a systolic array composed of a plurality of rows and columns; and a plurality of activation groups respectively corresponding to the rows, wherein calculator groups included in each of the rows are coupled to a single data path corresponding to the row and a plurality of drain paths corresponding to the row, wherein each of the activation groups comprises a plurality of sub activation units configured to receive a plurality of drain value sets from the drain paths of the corresponding row at the same time, and each of the sub activation units performs an activation function calculation based on the corresponding drain value set.

In accordance with the present embodiments, the calculation circuit and the deep learning system including the same may operate with high operation efficiency and high hourly throughput.

BRIEF DESCRIPTION OF THE DRAWINGS

FIG. 1B illustrates calculation result of the calculation circuit of FIG. 1A.

FIG. 18B is an output timing diagram of the LSTM network to which the deep learning system of FIG. 15 is applied.

DETAILED DESCRIPTION

Figure 1A:
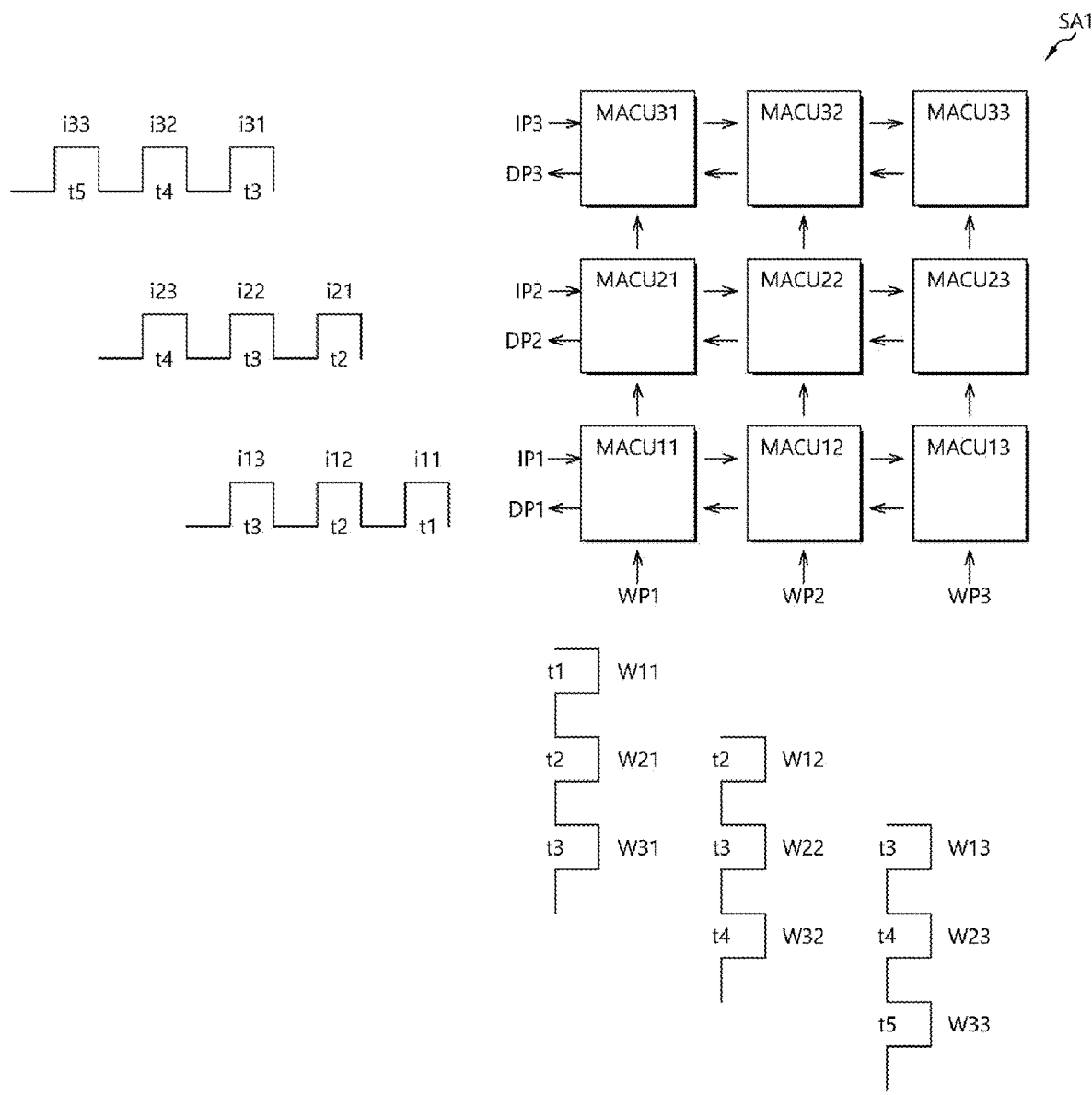
FIG. 1A illustrates a calculation circuit including a 3×3 systolic array.

The advantages and characteristics of the present disclosure and a method for achieving the advantages and characteristics will be described through the following embodiments with reference to the accompanying drawings. However, the present disclosure is not limited to the embodiments described herein, but may be embodied in different manners. The present embodiments are only provided to describe the present disclosure in detail, such that the technical idea of the present disclosure can be easily carried out by those skilled in the art to which the present disclosure pertains.

The present embodiments are not limited to specific shapes illustrated in the drawings, but may be exaggerated for clarity. In this specification, specific terms are used. However, the terms are only used to describe the present disclosure, and do not limit the scope of the present disclosure, described in claims.

In this specification, an expression such as 'and/or' may indicate including one or more of components listed before/after the expression. Moreover, an expression such as 'connected/coupled' may indicate that one element is directly connected/coupled to another element or indirectly connected/coupled to another element through still another element. The terms of a singular form may include plural forms unless referred to the contrary. Furthermore, the meanings of 'include' and 'comprise' or 'including' and 'comprising' may specify a component, step, operation and element, and do not exclude the presence or addition of one or more other components, steps, operations and elements.

Hereafter, illustrative embodiments will be described in detail with reference to the accompanying drawings.

FIG. 1A illustrates a calculation circuit SA1 including a 3×3 systolic array.

The calculation circuit SA1 may include calculators MACU11 to MACU13, MACU21 to MACU23, and MACU31 to MACU33 constituting a systolic array composed of three rows and three columns. Each of the calculators MACU11 to MACU13, MACU21 to MACU23, and MACU31 to MACU33 may include a MAC (Multiplier-Accumulator) circuit. The three rows may be coupled to data paths IP1 to IP3 to which data values are propagated, respectively, and connected to drain paths DP1 to DP3 to which drain values are propagated, respectively. The three columns may be coupled to weight paths WP1 to WP3 to which weight values are propagated, respectively.

Each of the rows of the systolic array may receive a data value set including three data values through the corresponding data path. The first row (the bottom row in FIG. 1A) may first start to receive the data value set in a first input period, for example, a first clock period, and each of the other rows from the second row to the last row may receive the data value set later by one clock period than the previous row.

Each of the columns of the systolic array may receive a weight value set including three weight values through the corresponding weight path. The first column (the left-most column in FIG. 1A) may first start to receive the weight value set, and each of the other columns from the second column to the last column may receive the weight value set later by one clock period than the previous column.

In each of the rows, the three data values may be sequentially inputted to the first calculator of the corresponding row one by one in each clock period. The calculators of each of the rows may propagate data values, inputted in the previous clock period, to the next calculators in the data propagation direction (here, from left to right) in the current clock period. The data values may be propagated rightward to the last calculator of each of the rows.

In each of the columns, the three weight values may be sequentially inputted to the first calculator of the corresponding column one by one in each clock period. The calculators of each of the columns may propagate weight values, inputted in the previous clock period, to the next calculators in the weight propagation direction (here, upwards) in the current clock period. The weight values may be propagated up to the last calculator of each of the columns.

For example, at a first clock t1, a data value i11 may be inputted to the calculator MACU11 through the data path IP1, and a weight value w11 may be inputted to the calculator MACU11 through the weight path WP1.

At a second clock t2, the calculator MACU11 may propagate the data value i11 to the calculator MACU12 through the data path IP1, and propagate the weight value w11 to the calculator MACU21 through the weight path WP1. Furthermore, data values i12 and i21 may be inputted to the calculators MACU11 and MACU21 through the data paths IP1 and IP2, respectively. Weight values w21 and w12 may be inputted to the calculators MACU11 and MACU12 through the weight paths WP1 and WP2, respectively.

At a third clock t3, the calculator MACU12 may propagate the data value i11 to the calculator MACU13 through the data path IP1, and propagate the weight value w12 to the calculator MACU22 through the weight path WP2. The calculator MACU21 may propagate the data value i21 to the calculator MACU22 through the data path IP2, and propagate the weight value w11 to the calculator MACU31 through the weight path WP1. The calculator MACU11 may propagate the data value i12 to the calculator MACU12 through the data path IP1, and propagate the weight value w21 to the calculator MACU21 through the weight path WP1. Furthermore, data values i13, i22 and i31 may be inputted to the calculators MACU11, MACU21 and MACU31 through the data paths IP1, IP2 and IP3, respectively. Weight values w31, w22 and w13 may be inputted to the calculators MACU11, MACU12 and MACU13 through the weight paths WP1, WP2 and WP3, respectively.

In this way, the other data values and weight values may be inputted to the calculators at a fourth clock t4 and a fifth clock t5. The data values may be propagated rightward to the last calculators MACU13, MACU23 and MACU33 of the rows, and the weight values may be propagated up to the last calculators MACU11, MACU21 and MACU31 of the columns.

Although not illustrated, the calculation circuit SA1 may further include a control unit. The control unit may input data values and weight values to the systolic array in their respective proper clock periods.

FIG. 1B is a diagram illustrating a calculation result of the calculation circuit SA1 of FIG. 1A.

Referring to FIG. 1B, each of the calculators MACU11 to MACU13, MACU21 to MACU23 and MACU31 to MACU33 may multiply the data values and the weight values inputted thereto in the respective clock periods, and generate a result value, i.e. a drain value, by accumulating the multiplication results.

Each of the rows in the systolic array may output a drain value set including three drain values through the corresponding drain path. All of the rows of the systolic array may start to output the drain value sets at the same time.

Each of the calculators in each of the rows may propagate its drain value in the drain propagation direction (here, from right to left), and then propagate subsequent drain values propagated from the previous calculator. Therefore, the first calculator MACU11 of the first row may sequentially output the drain values d11, d12, and d13 of the calculators MACU11 to MACU13 at the clocks t11 to t13, the first calculator MACU21 of the second row may sequentially output the drain values d21, d22, and d23 of the calculators MACU21 to MACU23 at the clocks t11 to t13, and the first calculator MACU31 of the third row may sequentially output the drain values d31, d32, and d33 of the calculators MACU31 to MACU33 at the clocks t11 to t13.

Figure 2A:
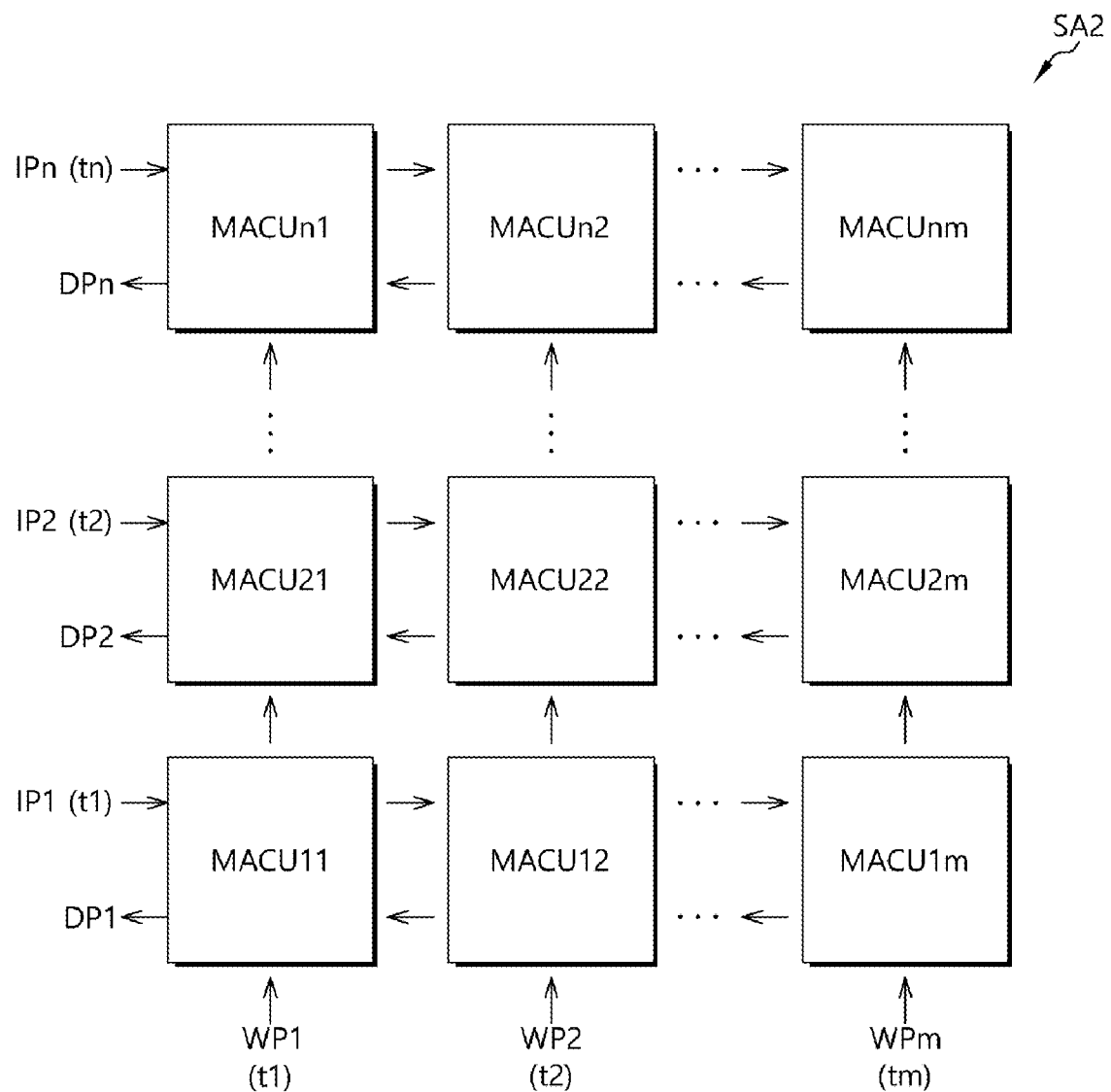
FIG. 2A illustrates a calculation circuit including an n×m systolic array.

FIG. 2A is a block diagram illustrating a calculation circuit SA2 including an n×m systolic array.

The calculation circuit SA2 may include calculators MACU11 to MACU1m, MACU21 to MACU2m, ... and MACUn1 to MACUnm constituting a systolic array composed of n rows and m columns. Each of the calculators MACU11 to MACU1m, MACU21 to MACU2m, ... and MACUn1 to MACUnm may include a MAC. The calculators MACU11 to MACU1m, MACU21 to MACU2m, ... and MACUn1 to MACUnm may be coupled to data paths IP1 to IPn, drain paths DP1 to DPn and weight paths WP1 to WPm. Each of the n rows may be coupled to the corresponding single data path among the data paths IP1 to IPn. Each of the n rows may be coupled to the corresponding single drain path among the drain paths DP1 to DPn. Each of the m columns may be coupled to the corresponding single weight path among the weight paths WP1 to WPm.

FIG. 2A also illustrates times t1 to tn at which data value sets start being inputted to the data paths IP1 to IPn. Times may indicate a clock period. For example, the calculator MACU11 may start to receive a data value set from the data path IP1 at the time t1. Then, the calculator MACU11 may propagate a data value to the calculator MACU12 through the data path IP1 at the next time t2.

Furthermore, FIG. 2A also illustrates times t1 to tm at which weight value sets start to be inputted to the weight paths WP1 to WPm. For example, the calculator MACU11 may start to receive a weight value set from the weight path WP1 at the time t1. Then, the calculator MACU11 may propagate a weight value to the calculator MACU21 through the weight path WP1 at the next time t2.

The drain value sets generated in the respective rows may start to be outputted from the first calculators MACU11 to MACUn1 of the rows through the drain paths DP1 to DPn at the same time.

Figure 2B:
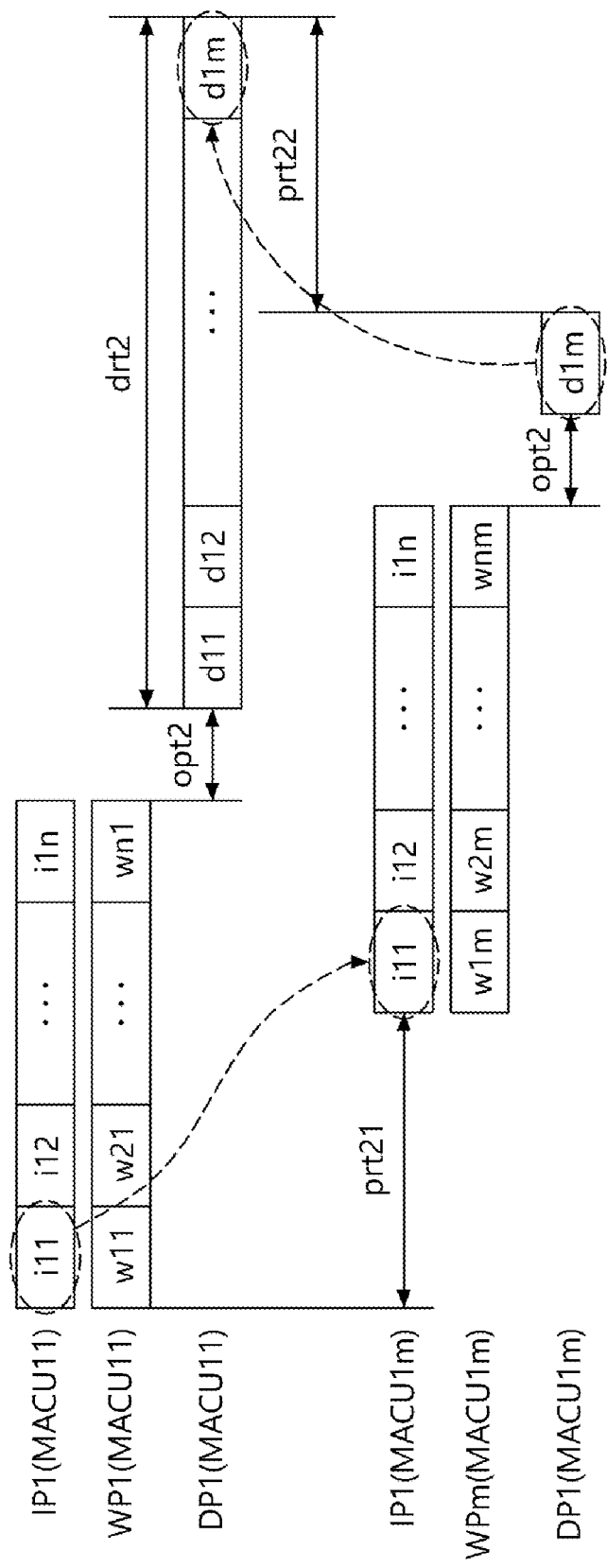
FIG. 2B illustrates operations of a first calculator and an $m^{th}$ calculator in a first row of the n×m systolic array of FIG. 2A.

FIG. 2B is a timing diagram illustrating operations of the first calculator MACU11 and the $m^{th}$ calculator MACU1m in the first row of the n×m systolic array of FIG. 2A.

Referring to FIGS. 2A and 2B, the operations of the calculators MACU11 to MACU1m in the first row will be described. First, n data values i11 to i1n and n weight values w11 to wn1 may be sequentially inputted to the first calculator MACU11 through the data path IP1 and the weight path WP1. The data values i11 to i1n may constitute a data value set corresponding to the first row, and the weight values w11 to wn1 may constitute a weight value set corresponding to the first column.

The first calculator MACU11 may output its drain value d11 after an operation time opt2 has elapsed since the last data value i1n was received by the first calculator MACU11. In an embodiment, the operation time opt2 may correspond to the time required by the first calculator MACU11 to perform a multiply accumulate operation.

FIG. 2B does not illustrate data values and weight values received by the second calculator MACU12. However, the second calculator MACU12 operates in a similar manner to the first calculator MACU11. That is, the second calculator MACU12 may generate a drain value d12 using the n data values i11 to i1n corresponding to the first row and n weight values w12 to wn2 corresponding to the second column and propagate the drain value d12 to the first calculator MACU11 through the drain path DP1. The first calculator MACU11 may output the drain value d12 through the drain path DP1 after outputting the drain value d11.

The data values i11 to i1n may be sequentially propagated to the first to $m^{th}$ calculators MACU11 to MACU1m through the data path IP1. A data propagation time prt21 may indicate the time required until the first data value i11 is propagated from the first calculator MACU11 to the $m^{th}$ calculator MACU1m. Weight values w1m to wnm may be inputted to the $m^{th}$ calculator MACU1m through the weight path WPm. The weight values w1m to wnm may constitute a weight value set corresponding to the $m^{th}$ column.

The $m^{th}$ calculator MACU1m may output its drain value d1m after the operation time opt2 has elapsed since the last data value i1n was received by the $m^{th}$ calculator MACU1m. The drain value d1m may be propagated from the $m^{th}$ calculator MACU1m to the first calculator MACU11 through the drain path DP1, and then outputted from the first calculator MACU11. A drain propagation time prt22 may indicate the time required for the drain value d1m to propagate from the $m^{th}$ calculator MACU1m through the drain path DP1 and to then be outputted from the first calculator MACU11. The drain values d11 to d1m may constitute the drain value set corresponding to the first row.

Furthermore, a drain time drt2 may indicate the time required for the first calculator MACU11 to output all the drain values d11 to d1m of the calculators MACU11 to MACU1m of the first row.

Figure 3:
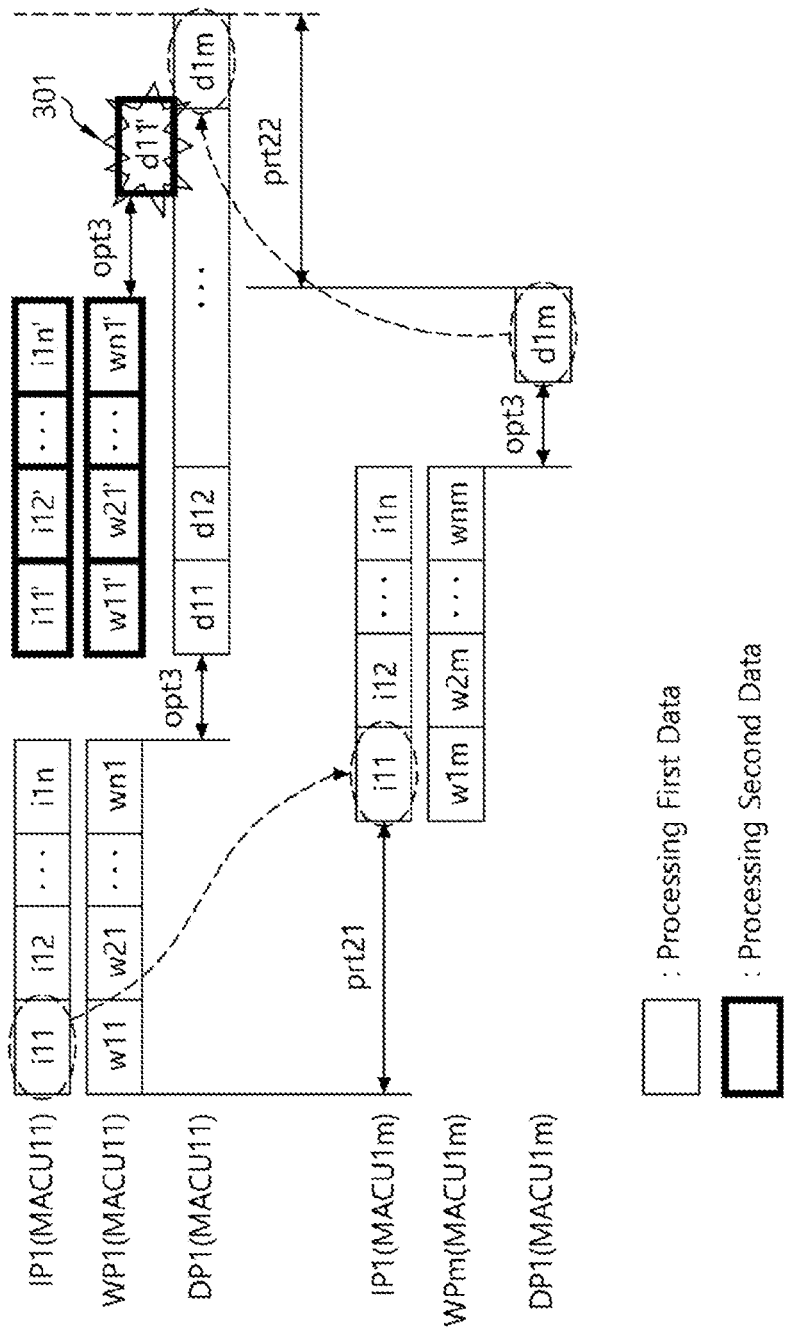
FIG. 3 is a timing diagram illustrating a drain conflict.

FIG. 3 is a timing diagram illustrating a drain conflict 301. FIG. 3 illustrates operations of the first calculator MACU11 and the $m^{th}$ calculator MACU1m which are included in the first (i.e. bottom) row of the calculation circuit SA2 of FIG. 2A.

Referring to FIG. 3, the calculation circuit SA2 may process first data, and then process second data.

The process in which the first calculator MACU11 outputs the drain values d11 to d1m for the first data may be performed in a similar manner to the process described with reference to FIG. 2B. However, when n of FIG. 3 is smaller than n of FIG. 2B or the number of data values constituting a data value set in FIG. 3 is smaller than in FIG. 2B, the total time required until the data values i11 to i1n are inputted to the calculators MACU11 to MACU1m may be smaller than the time of FIG. 2B. When m of FIG. 2B is equal to m of FIG. 3, the data propagation time prt21 and the drain propagation time prt22 may be substantially equal to the times prt21 and prt22 of FIG. 2B.

After the drain value d11 of the first data is generated through the first calculator MACU11, data values i11' to i1n' and weight values w11' to wn1' of the second data may be inputted. In this case, when the drain value d11' of the first calculator MACU11 for the second data is generated and outputted while the drain values d11 to d1m for the first data are outputted from the first calculator MACU11, a drain conflict 301 may occur.

One factor that can cause the drain conflict 301 may be the data propagation time prt21 and the drain propagation time prt22. That is, when the data propagation time prt21 is long, the start of the operation of calculating the first data through the $m^{th}$ calculator MACU1m may be delayed. Furthermore, when the drain propagation time prt22 is long, the completion of the operation of outputting the drain values d11 to d1m of the first data through the first calculator MACU11 may be delayed. Therefore, the completion of the operation of processing the first data may be delayed, thereby causing the drain conflict 301.

Figure 4:
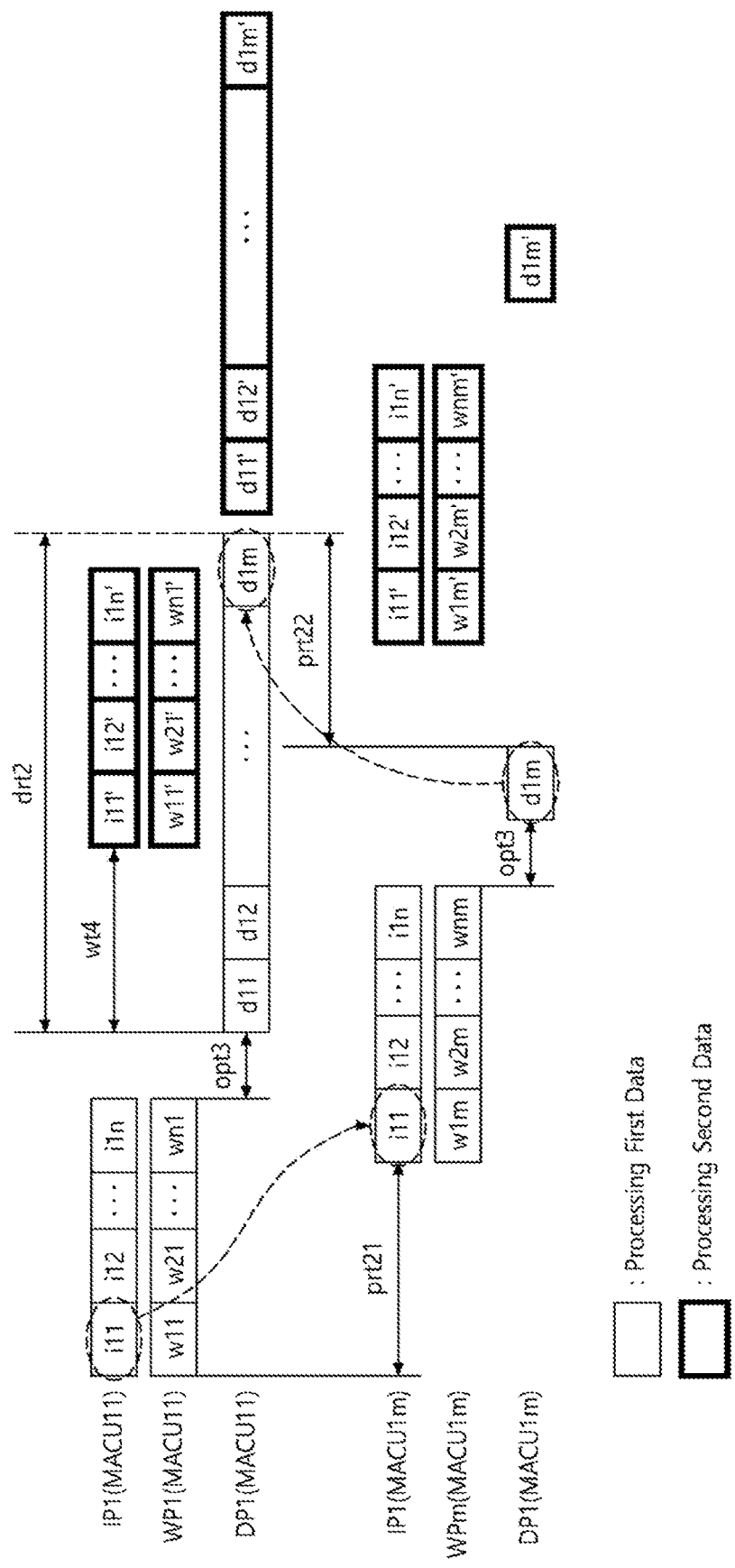
FIG. 4 is a timing diagram illustrating an operation for preventing a drain conflict in FIG. 3.

FIG. 4 is a timing diagram illustrating an operation for preventing the drain conflict 301 shown in FIG. 3. FIG. 4 illustrates operations of the first calculator MACU11 and the $m^{th}$ calculator MACU1m which are included in the first (i.e. bottom) row of the calculation circuit SA2 of FIG. 2A Referring to FIG. 4, the process in which the first calculator MACU11 outputs the drain values d11 to d1m for the first data may be performed in a similar manner to the process of FIG. 3. However, in order to prevent the drain conflict 301, the first calculator MACU11 may receive the second data after a waiting time wt4 has passed since the operation of the first calculator MACU11 was completed. The waiting time wt4 may be set so that the drain value d11' for the second data is generated and outputted after the first calculator MACU11 outputs all of the drain values d11 to d1m of the first data.

However, while the setting of the waiting time wt4 can prevent the drain conflict 301, it may cause side effects such as low operation efficiency and reduction in hourly throughput in the systolic array.

Figure 5:
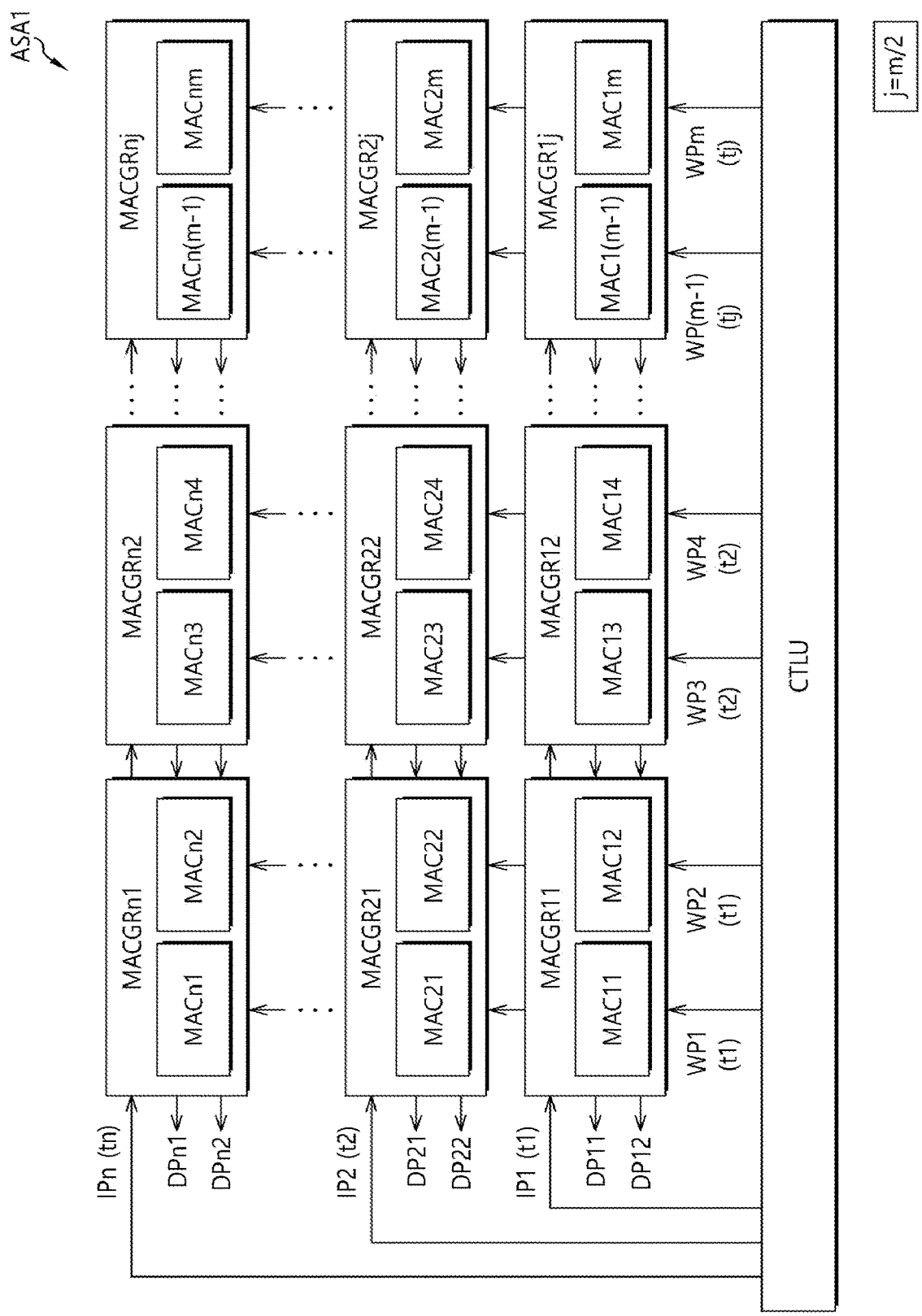
FIG. 5 illustrates a calculation circuit including an advanced systolic array in accordance with an embodiment.

FIG. 5 is a block diagram illustrating a calculation circuit ASA1 including an advanced systolic array in accordance with an embodiment.

The calculation circuit ASA1 may include calculator groups MACGR11 to MACGR1j, MACGR21 to MACGR2j, . . . and MACGRn1 to MACGRnj constituting an advanced systolic array composed of n rows and j columns. Each of the calculator groups MACGR11 to MACGR1j, MACGR21 to MACGR2j, . . . and MACGRn1 to MACGRnj may include two MAC circuits. FIG. 5 illustrates the case in which two MAC circuits are included in each of the calculator groups. In accordance with the present embodiment, however, each of the calculator groups may include three or more MAC circuits.

The calculator groups MACGR11 to MACGR1j, MACGR21 to MACGR2j, . . . and MACGRn1 to MACGRnj may be coupled through data paths IP1 to IPn, drain paths DP11 to DPn1 and DP12 to DPn2 and weight paths WP1 to WPm. Each of the n rows may be coupled to one corresponding data path among the data paths IP1 to IPn. Each of the n rows may be coupled to two corresponding drain paths among the drain paths DP11 to DPn1 and DP12 to DPn2. Each of the j columns may be coupled to two corresponding weight paths among the weight paths WP1 to WPm. Here, j may be ½ of m. In embodiments similar to FIG. 5 but having three or more MAC circuits in each calculator group, each of the j columns may be coupled to a number of weight paths equal to the number of MAC circuits in each calculator group, each of the n rows may be coupled to a number of drain paths equal to the number of MAC circuits in each calculator group, and j may be equal to m divided by the number of MAC circuits in each calculator group, but embodiments are not limited thereto.

FIG. 5 also illustrates times t1 to tn at which data value sets start to be inputted to the data paths IP1 to IPn. For example, the calculator group MACGR11 may start to receive a data value set from the data path IP1 at the time t1. Then, the calculator group MACGR11 may propagate a data value to the calculator group MACGR12 through the data path IP1 at the next time t2. In an embodiment, each time may correspond to a respective period of a clock, but embodiments are not limited thereto.

Furthermore, FIG. 5 also illustrates times t1 to tj at which weight value sets start to be inputted to the weight paths WP1 to WPm. For example, the calculator group MACGR11 may start to receive two weight value sets from the weight paths WP1 and WP2, respectively, at the time t1. Then, the calculator group MACGR11 may propagate weight values to the calculator group MACGR21 through the weight paths WP1 and WP2 at the next time t2.

Drain value sets generated in the rows may start to be outputted from the first calculator groups MACGR11 to MACGRn1 of the respective rows through the drain paths DP11 to DPn1 and DP12 to DPn2 at the same time. As will be described below, the two MAC circuits in each of the calculator groups may generate two drain values at the same time, and each of the rows may output two drain value sets through two drain paths at the same time.

The calculation circuit ASA1 may further include a control unit CTLU for controlling the operations of the calculator groups MACGR11 to MACGRn1 through control signals. The control unit CTLU may input data values and weight values to the systolic array in their proper clock periods.

Figure 6:
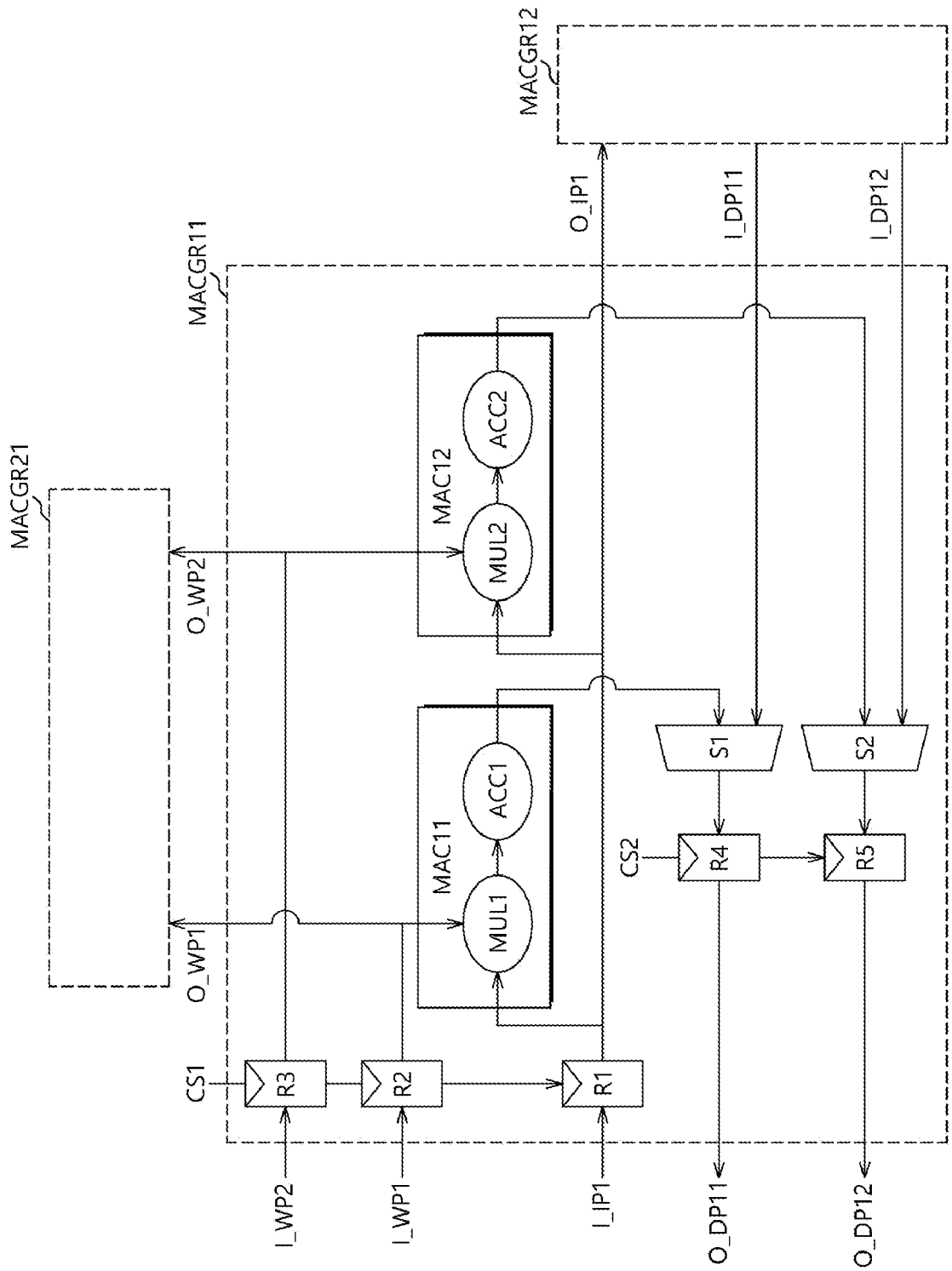
FIG. 6 illustrates a calculator group of FIG. 5 in detail in accordance with the present embodiment.

FIG. 6 is a diagram illustrating the calculator group MACGR11 of FIG. 5 in accordance with the present embodiment in detail.

Referring to FIG. 6, an input data path I_IP1 and an output data path O_IP1 may be included in the data path IP1 of FIG. 5. A first input weight path I_WP1 and a first output weight path O_WP1 may be included in the weight path WP1 of FIG. 5. A second input weight path I_WP2 and a second output weight path O_WP2 may be included in the weight path WP2 of FIG. 5. A first input drain path I_DP11 and a first output drain path O_DP11 may be included in the drain path DP11 of FIG. 5. A second input drain path I_DP12 and a second output drain path O_DP12 may be included in the drain path DP12 of FIG. 5.

The calculator group MACGR11 may include first and second MAC circuits MAC11 and MAC12, storage units R1 to R5 and selection units S1 and S2. The first MAC circuit MAC11 may include a first multiplier MUL1 and a first accumulator ACC1. The second MAC circuit MAC12 may include a second multiplier MUL2 and a second accumulator ACC2. The storage units R1 to R5 may be configured as flip-flops (for example, edge-triggered D flip-flops) or latches. The constituent units included in the calculator group MACGR11 may operate under control of the control unit CTLU shown in FIG. 5.

The storage unit R1 may receive a data value from the input data path I_IP1 and store the received data value therein. The storage unit R1 may output the stored data value to the first multiplier MUL1, the second multiplier MUL2 and the output data path O_IP1 in response to a control signal CS1. The data value outputted to the output data path O_IP1 may be propagated to the calculator group MACGR12.

The storage unit R2 may receive a weight value from the first input weight path I_WP1 and store the received weight value therein. The storage unit R2 may output the stored weight value to the first multiplier MUL1 and the first output weight path O_WP1 in response to the control signal CS1. The weight value outputted to the first output weight path O_WP1 may be propagated to the calculator group MACGR21.

The storage unit R3 may receive a weight value from the second input weight path I_WP2 and store the received weight value therein. The storage unit R3 may output the stored weight value to the second multiplier MUL2 and the second output weight path O_WP2 in response to the control signal CS1. The weight value outputted to the second output weight path O_WP2 may be propagated to the calculator group MACGR21.

The storage units R1 to R3 may simultaneously output values, received at the previous timing, at the subsequent timing in response to the control signal CS1.

The first multiplier MUL1 may receive the data value outputted from the storage unit R1 and the weight value outputted from the storage unit R2, multiply the received values, and output the multiplication result to the first accumulator ACC1. The first accumulator ACC1 may generate a first drain value by receiving and accumulating the outputs of the first multiplier MUL1, and output the first drain value to the selection unit S1.

The second multiplier MUL2 may receive the data value outputted from the storage unit R1 and the weight value outputted from the storage unit R3, multiply the received values, and output the multiplication result to the second accumulator ACC2. The second accumulator ACC2 may generate a second drain value by receiving and accumulating the outputs of the second multiplier MUL2, and output the second drain value to the selection unit S2.

The selection unit S1 may output the first drain value, outputted from the first accumulator ACC1, to the storage unit R4. After outputting the first drain value of the first accumulator ACC1, the selection unit S1 may sequentially output subsequent drain values, propagated from the calculator group MACGR12 through the first input drain path I_DP11, to the storage unit R4. The storage unit R4 may receive the drain value outputted from the selection unit S1, store the received drain value therein, and output the stored drain value to the first output drain path O_DP11 in response to a control signal CS2.

The selection unit S2 may output the second drain value, outputted from the second accumulator ACC2, to the storage unit R5. After outputting the second drain value of the second accumulator ACC2, the selection unit S2 may sequentially output subsequent drain values, propagated from the calculator group MACGR12 through the second input drain path I_DP12, to the storage unit R5. The storage unit R5 may receive the drain value outputted from the selection unit S2, store the received drain value therein, and output the stored drain value to the second output drain path O_DP12 in response to the control signal CS2.

The storage units R4 and R5 may output the drain values stored therein at the same time in response to the control signal CS2.

The other calculator groups of FIG. 5 may be configured in a similar manner to the calculator group MACGR11. However, the last calculator groups MACGR1j to MACGRnj of the rows may not include the output data path O_IP1. Furthermore, the last calculator groups MACGR1j to MACGRnj of the rows may not include the first input drain path I_DP11, the second input drain path I_DP12 and the selection units S1 and S2, and the drain values outputted from the first and second accumulators ACC1 and ACC2 may be directly inputted to the storage units R4 and R5. Furthermore, the last calculator groups MACGRn1 to MACGRnj of the columns may not include the first output weight path O_WP1 and the second output weight path O_WP2.

Figure 7:
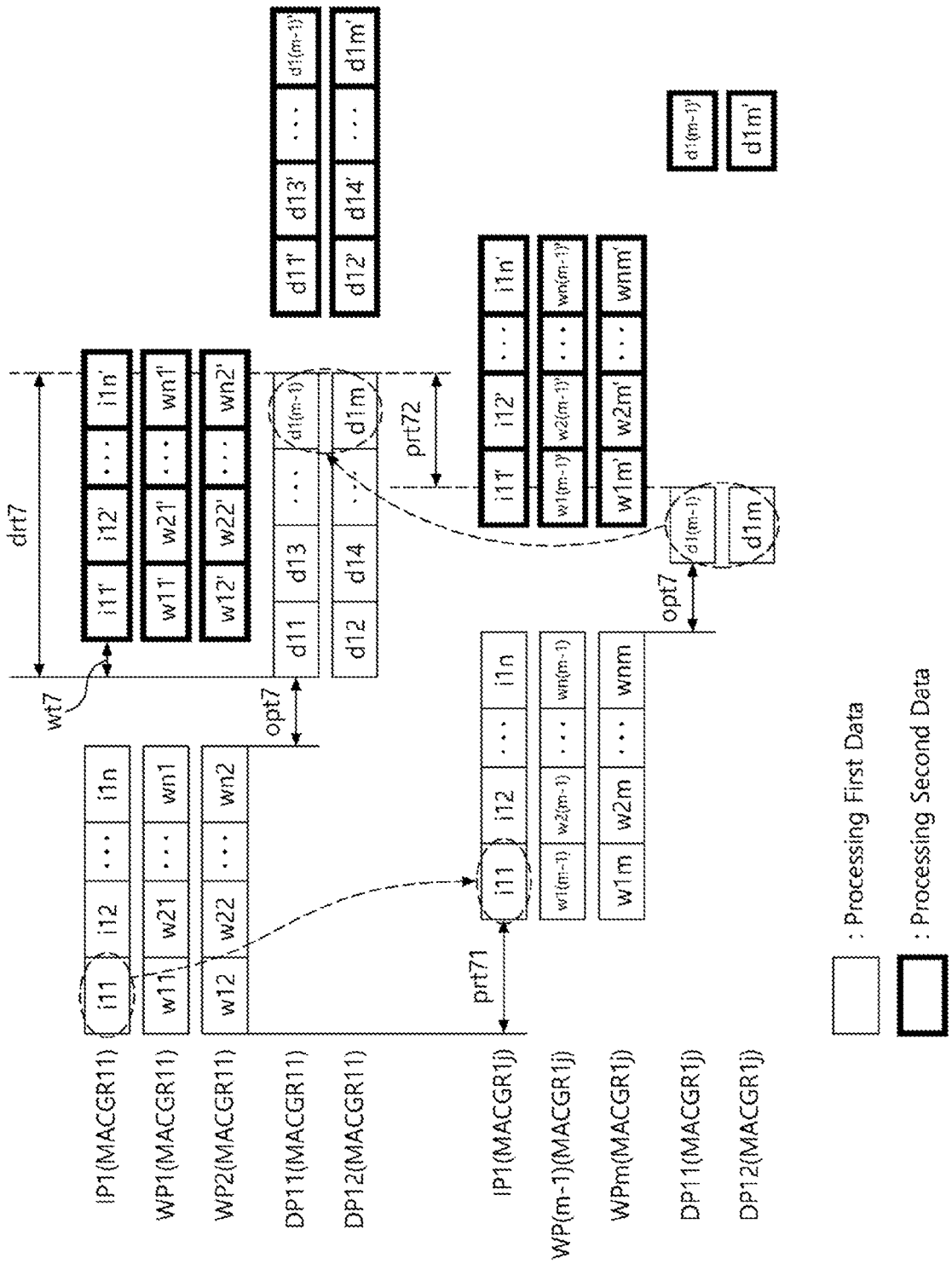
FIG. 7 is a timing diagram illustrating operations of a first calculator group and a $j^{th}$ calculator group which are included in a first row of the advanced systolic array of FIG. 5 in accordance with the present embodiment.

FIG. 7 is a timing diagram illustrating operations of the first calculator group MACGR11 and the $j^{th}$ calculator group MACGR1j which are included in the first row of the advanced systolic array of FIG. 5 in accordance with the present embodiment.

Referring to FIGS. 5 to 7, n data values i11 to i1n may be sequentially inputted to the first calculator group MACGR11 through the data path IP1. Simultaneously, n weight values w11 to wn1 may be sequentially inputted to the first calculator group MACGR11 through the weight path WP1, and n weight values w12 to wn2 may be sequentially inputted to the first calculator group MACGR11 through the weight path WP2. The data values i11 to i1n may constitute a data value set corresponding to the first row, and the weight values w11 to wn1 and the weight values w12 to wn2 may constitute a weight value set corresponding to the first column.

The first and second MACs MAC11 and MAC12 of the first calculator group MACGR11 may be simultaneously operated to generate the drain values d11 and d12. The first calculator group MACGR11 may output the drain values d11 and d12 through the drain paths DP11 and DP22, i.e. the first and second output drain paths O_DP11 and O_DP12, respectively, after an operation time opt7 has elapsed since the last data value i1n was received by the first calculator group MACGR11.

A data propagation time prt71 may indicate the time required until the data value i11 is propagated from the first calculator group MACGR11 to the $j^{th}$ calculator group MACGR1j. For the same values of m, the data propagation time prt71 may be ½ of the data propagation time prt21 of FIG. 4. In short, since two weight paths WP1 and WP2 simultaneously propagate two weight values w11 and w12, the first and second MACs MAC11 and MAC12 may receive data values at the same time, and perform calculations at the same time. That is, the data value i11 may pass through one MAC in the systolic array of FIG. 2A during one input period, but pass through two MACs in the systolic array of FIG. 5 during one input period. As a result, the data value i11 may be propagated through the systolic array ASA1 of FIG. 5 two times faster than in the systolic array SA2 of FIG. 2A.

The data values i11 to i1n may be sequentially propagated to the first to $j^{th}$ calculator groups MACGR11 to MACGR1j through the data path IP1. Simultaneously with the data values i11 to i1n being inputted to the $j^{th}$ calculator group MACGR1j, n weight values w1(m−1) to wn(m−1) may be sequentially inputted to the $j^{th}$ calculator group MACGR1j through the weight path WP(m−1), and n weight values w1m to wnm may be sequentially inputted to the $j^{th}$ calculator group MACGR1j through the weight path WPm. The weight values w1(m−1) to wn(m−1) and the weight values w1m to wnm may constitute the weight value sets corresponding to the $j^{th}$ column, respectively.

The first and second MAC circuits MAC1(m−1) and MAC1m of the $j^{th}$ calculator group MACGR1j may be simultaneously operated to generate the drain values d1(m−1) and d1m. The $j^{th}$ calculator group MACGR1j may output the drain values d1(m−1) and d1m through the drain paths DP11 and DP12, respectively, after the operation time opt7 has elapsed since the last data value in was received by the $j^{th}$ calculator group MACGR1j.

A drain propagation time prt72 may indicate the time required until the drain values d1(m−1) and d1m are propagated from the $j^{th}$ calculator group MACGR1j through the drain paths DP11 and DP12 and then outputted from the first calculator group MACGR11. In this case, for a same value of m, the drain propagation time prt72 may be ½ of the drain propagation time prt22 of FIG. 4. That is, unlike the configuration of FIG. 2A in which one drain value set constituted by the drain values d11 to d1m is propagated through one drain path DP1, two drain value sets constituted by the drain values d11 to d1(m−1) and the drain values d12 to d1m, respectively, may be propagated through two drain paths DP11 and DP12. As a result, m drain values in the systolic array ASA1 of FIG. 5 may pass two times faster than in the systolic array SA2 of FIG. 2A.

The first calculator group MACGR11 may receive the second data after a waiting time wt7 has elapsed since the operation of the first calculator group MACGR11 was completed. The waiting time wt7 may be set so that the drain values d11' and d1m' of the second data start to be outputted after all of the drain values d11 to d1m of the first data are outputted from the first calculator group MACGR11. In other words, the waiting time wt7 may be set so that no drain conflict occurs.

When the data propagation time prt71 is shorter than the data propagation time prt21 of FIG. 4, the calculation operations of the calculation groups MACGR11 to MACGR1j may be started earlier. Furthermore, when the drain propagation time prt72 is shorter than the drain propagation time prt22 of FIG. 4, the output operations of the drain values d11 to d1m through the first calculator group MACGR11 may be advanced. In this case, a drain time drt7 may be shorter than the drain time drt2 of FIG. 4, and the waiting time wt7 may be shorter than the waiting time wt4 of FIG. 4. Therefore, the calculation circuit ASA1 of FIG. 5 can operate with high operation efficiency and high hourly throughput compared to the circuit SA2 shown in FIG. 2.

Figure 8:
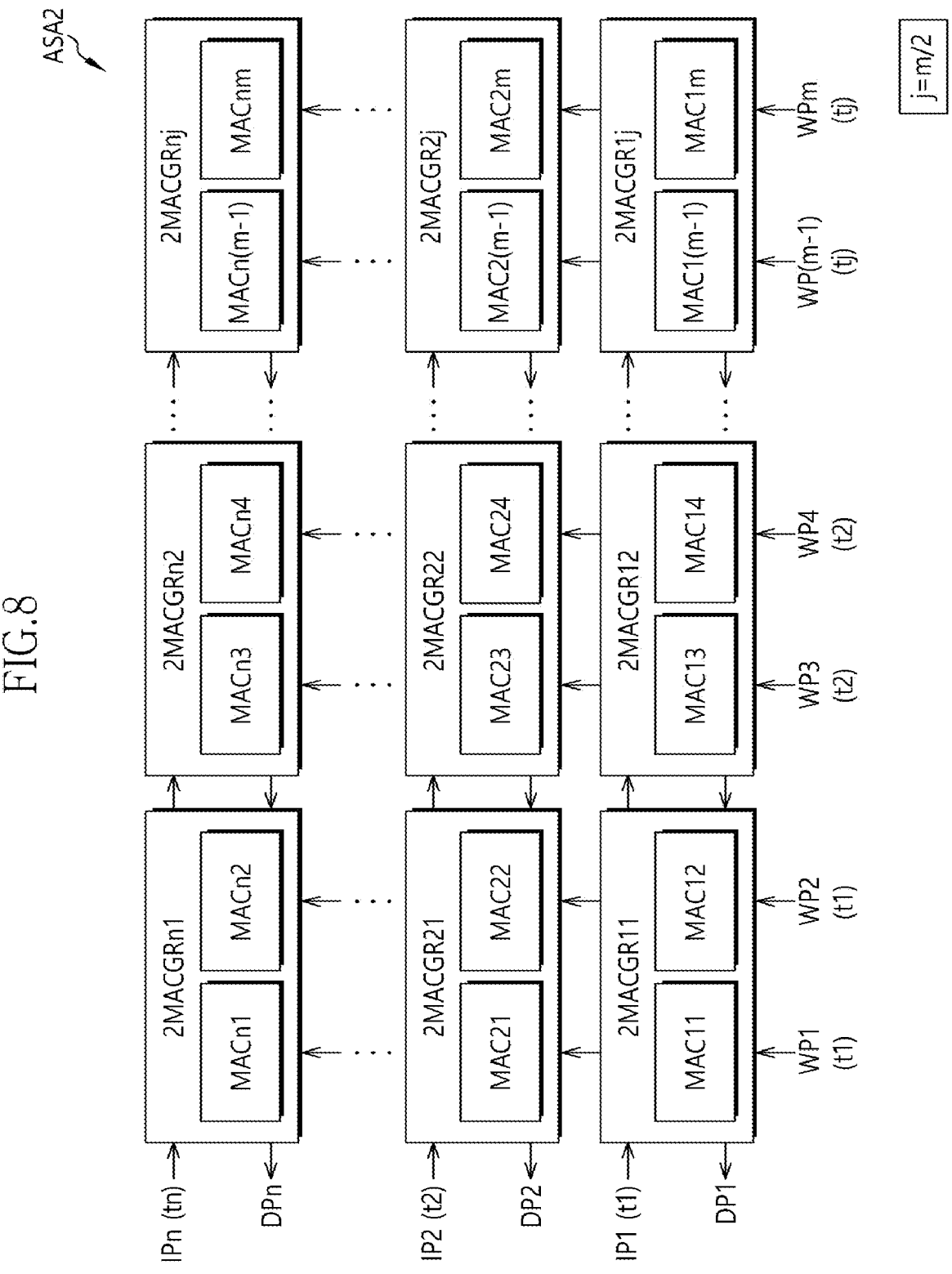
FIG. 8 illustrates a calculation circuit in accordance with an embodiment.

FIG. 8 is a block diagram illustrating a calculation circuit ASA2 in accordance with an embodiment.

The calculation circuit ASA2 may include calculator groups 2MACGR11 to 2MACGR1j, 2MACGR21 to 2MACGR2j, . . . , and 2MACGRn1 to 2MACGRnj constituting an advanced systolic array composed of n rows and j columns. Each of the calculator groups 2MACGR11 to 2MACGR1j, 2MACGR21 to 2MACGR2j, . . . , and 2MACGRn1 to 2MACGRnj may include two MAC circuits. FIG. 8 illustrates the case in which two MAC circuits are included in each of the calculator groups. In accordance with the present embodiment, however, each of the calculator groups may include three or more MAC circuits.

The calculator groups 2MACGR11 to 2MACGR1j, 2MACGR21 to 2MACGR2j, . . . , and 2MACGRn1 to 2MACGRnj may be coupled to data paths IP1 to IPn, drain paths DP1 to DPn and weight paths WP1 to WPm. Each of the n rows may be coupled to one corresponding data path among the data paths IP1 to IPn. Each of the n rows may be coupled to one corresponding drain path among the drain paths DP1 to DPn. Each of the j columns may be coupled to two corresponding weight paths among the weight paths WP1 to WPm. In embodiments similar to FIG. 8 but having three or more MAC circuits in each calculator group, each of the j columns may be coupled to a number of weight paths equal to the number of MAC circuits in each calculator group, and j may be equal to m divided by the number of MAC circuits in each calculator group, but embodiments are not limited thereto.

FIG. 8 also illustrates timings t1 to tn at which data value sets start to be inputted to the data paths IP1 to IPn and timings t1 to tj at which weight value sets start to be inputted to the weight paths WP1 to WPm. Operations at the respective timings may be performed in substantially the same manner as those described with reference to FIG. 5.

Drain value sets generated in the rows may start to be outputted from the first calculator groups 2MACGR11 to 2MACGRn1 of the respective rows through the drain paths DP1 to DPn at the same time. Each of the rows may output one drain value set through one drain path.

Although not illustrated, the calculation circuit ASA2 may further include a control unit for controlling the operations of the calculator groups 2MACGR11 to 2MACGR1j, 2MACGR21 to 2MACGR2j, . . . , and 2MACGRn1 to 2MACGRnj through control signals.

Figure 9:
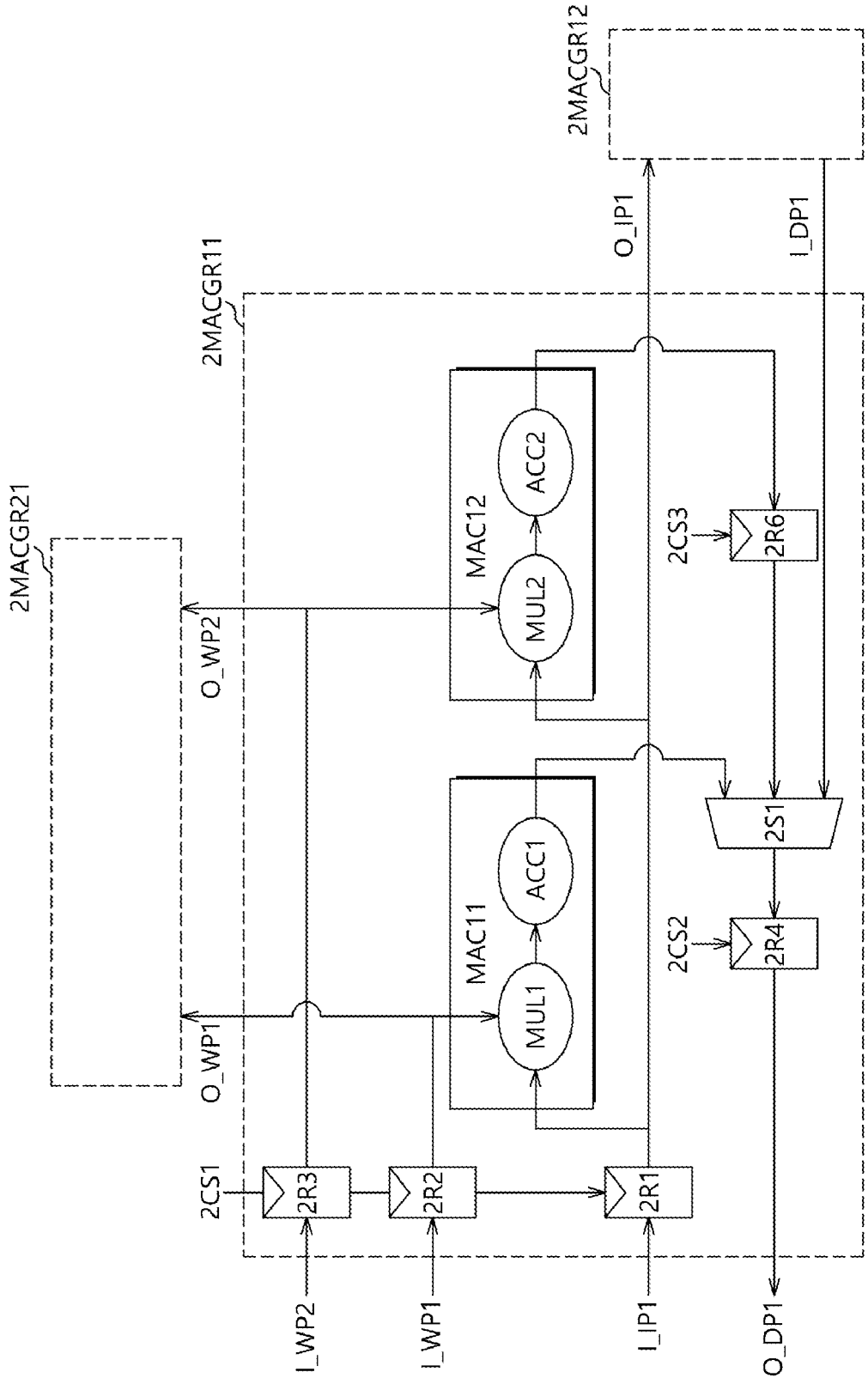
FIG. 9 illustrates a calculator group of FIG. 8 in detail in accordance with the present embodiment.

FIG. 9 is a diagram illustrating the calculator group 2MACGR11 of FIG. 8 in accordance with the present embodiment in detail.

Referring to FIG. 9, an input data path I_IP1 and an output data path O_IP1 may be included in the data path IP1 of FIG. 8. A first input weight path I_WP1 and a first output weight path O_WP1 may be included in the weight path WP1 of FIG. 8. A second input weight path I_WP2 and a second output weight path O_WP2 may be included in the weight path WP2 of FIG. 8. An input drain path I_DP1 and an output drain path O_DP1 may be included in the drain path DP1 of FIG. 8.

The calculator group 2MACGR11 may include first and second MAC circuits MAC11 and MAC12, storage units 2R1 to 2R4 and 2R6 and a selection unit 2S1. The first and second MAC circuits MAC11 and MAC12 may be configured in substantially the same manner as the first and second MACs MAC11 and MAC12 of FIG. 6. The storage units 2R1 to 2R3 may be configured in substantially the same manner as the storage units R1 to R3 of FIG. 6.

The storage unit 2R6 may receive a second drain value, outputted from the second accumulator ACC2, and store the received second drain value therein. The storage unit 2R6 may output the stored second drain value to the selection unit 2S1 in response to a control signal 2CS3.

The selection unit 2S1 may output a first drain value, outputted from the first accumulator ACC1, to the storage unit 2R4. After outputting the first drain value of the first accumulator ACC1, the selection unit 2S1 may output the second drain value, outputted from the storage unit 2R6, to the storage unit 2R4. After outputting the second drain value of the storage unit 2R6, the selection unit 2S1 may sequentially output subsequent drain values, propagated from the calculator group 2MACGR12 through the input drain path I_DP1, to the storage unit 2R4.

The storage unit 2R4 may receive the drain value outputted from the selection unit 2S1, store the received drain value therein, and output the stored drain value to the output drain path O_DP1 in response to a control signal 2CS2.

The other calculator groups of FIG. 8 may be configured in a similar manner to the calculator group 2MACGR11. However, the last calculator groups 2MACGR1j to 2MACGRnj of the rows may not include the output data path O_IP1 and the input drain path I_DP1. Furthermore, the last calculator groups 2MACGRn1 to 2MACGRnj of the columns may not include the first output weight path O_WP1 and the second output weight path O_WP2.

Figure 10:
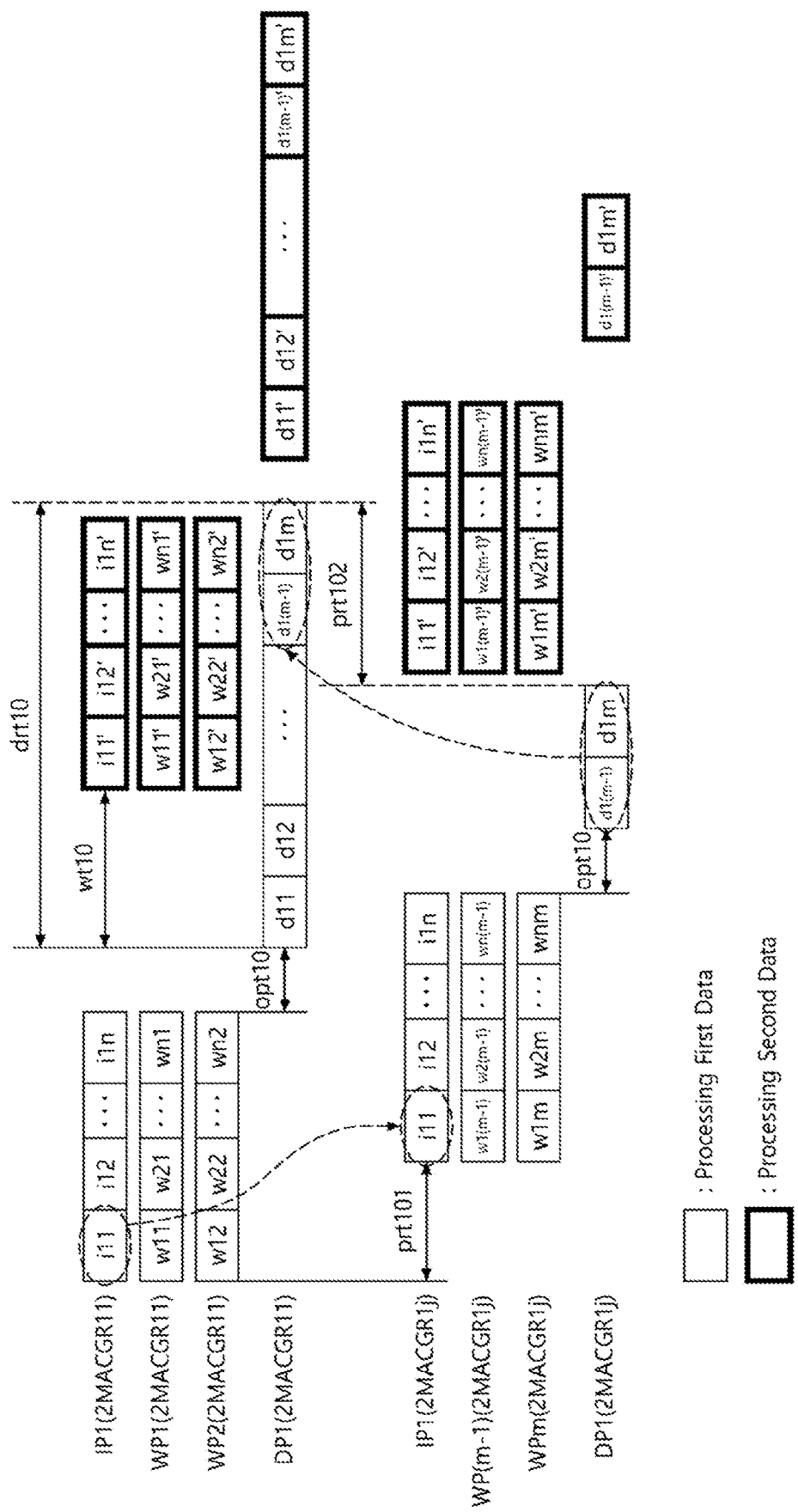
FIG. 10 is a timing diagram illustrating operations of a first calculator group and a $j^{th}$ calculator group which are included in a first row of an advanced systolic array of FIG. 8 in accordance with the present embodiment.

FIG. 10 is a timing diagram illustrating operations of the first calculator group 2MACGR11 and the $j^{th}$ calculator group 2MACGR1j which are included in the first row of the advanced systolic array ASA2 of FIG. 8 in accordance with the present embodiment.

Referring to FIGS. 8 to 10, n data values i11 to i1n may be sequentially inputted to the first calculator group 2MACGR11 through the data path IP1. Simultaneously, n weight values w11 to wn1 may be sequentially inputted to the first calculator group 2MACGR11 through the weight path WP1. In addition, simultaneously, n weight values w12 to wn2 may be sequentially inputted to the first calculator group 2MACGR11 through the weight path WP2. The data values i11 to i1n may constitute a data value set corresponding to the first row, and the weight values w11 to wn1 and the weight values w12 to wn2 may constitute weight value sets corresponding to the first column, respectively.

The first and second MACs MAC11 and MAC12 of the first calculator group 2MACGR11 may be simultaneously operated to generate the drain values d11 and d12. However, since the first calculator group 2MACGR11 is coupled to one drain path DP1, the first calculator group 2MACGR11 may sequentially output the drain values d11 and d12 through the drain path DP1 after an operation time opt10 has elapsed since the last data value i1n was received by the first calculator group 2MACGR11.

A data propagation time prt101 may indicate the time required until the data value i11 is propagated from the first calculator group 2MACGR11 to the $j^{th}$ calculator group 2MACGR1j. For the same value of m, the data propagation time prt101 may be ½ of the data propagation time prt21 of FIG. 4. That is, since the calculator groups 2MACGR1j to 2MACGR1j are coupled to two weight paths, the data propagation time prt101 may be shortened.

The data values i11 to i1n may be sequentially propagated to the first to $j^{th}$ calculator groups 2MACGR11 to 2MACGR1j through the data path IP1. Simultaneously to the inputting of the data values i11 to i1n to the $j^{th}$ calculator group 2MACGR1j, n weight values w1(m−1) to wn(m−1) may be sequentially inputted to the $j^{th}$ calculator group 2MACGR1j through the weight path WP(m−1), and n weight values w1m to wnm may be sequentially inputted to the $j^{th}$ calculator group 2MACGR1j through the weight path WPm. The weight values w1(m−1) to wn(m−1) and the weight values w1m to wnm may constitute weight value sets corresponding to the $j^{th}$ column, respectively.

The first and second MACs MAC1(m−1) and MAC1m of the $j^{th}$ calculator group 2MACGR1j may be simultaneously operated to generate the drain values d1(m−1) and d1m. However, since the $j^{th}$ calculator group 2MACGR1j is coupled to one drain path DP1, the $j^{th}$ calculator group 2MACGR1j may sequentially output the drain values d1(m−1) and d1m through the drain path DP1 after the operation time opt10 has elapsed since the last data value i1n was received by the $j^{th}$ calculator group 2MACGR1j.

A drain propagation time prt102 may indicate the time required until the drain values d1(m−1) and d1m are propagated from the $j^{th}$ calculator group 2MACGR1j through the drain path DP1 and then outputted from the first calculator group 2MACGR11. The drain values d11 to d1m may constitute the drain value set corresponding to the first row.

The first calculator group 2MACGR11 may receive the second data after a waiting time wt10 has elapsed since the operation of the first calculator group 2MACGR11 was completed. The waiting time wt10 may be set so that the drain values d11' and d1m' of the second data start to be outputted after all of the drain values d11 to d1m of the first data are outputted from the first calculator group 2MACGR11. In other words, the waiting time wt10 may be set so that no drain conflict occurs.

When the data propagation time prt101 becomes shorter than the data propagation time prt21 of FIG. 4, the calculation operations of the calculation groups 2MACGR11 to 2MACGR1j may be started earlier. In this case, the drain time drt10 may become shorter than the drain time drt2 of FIG. 4, and the waiting time wt10 may become shorter than the waiting time wt4 of FIG. 4. Therefore, the calculation circuit ASA2 may operate with high operation efficiency and high hourly throughput compared to the circuit SA2 shown in FIG. 2.

Figure 11:
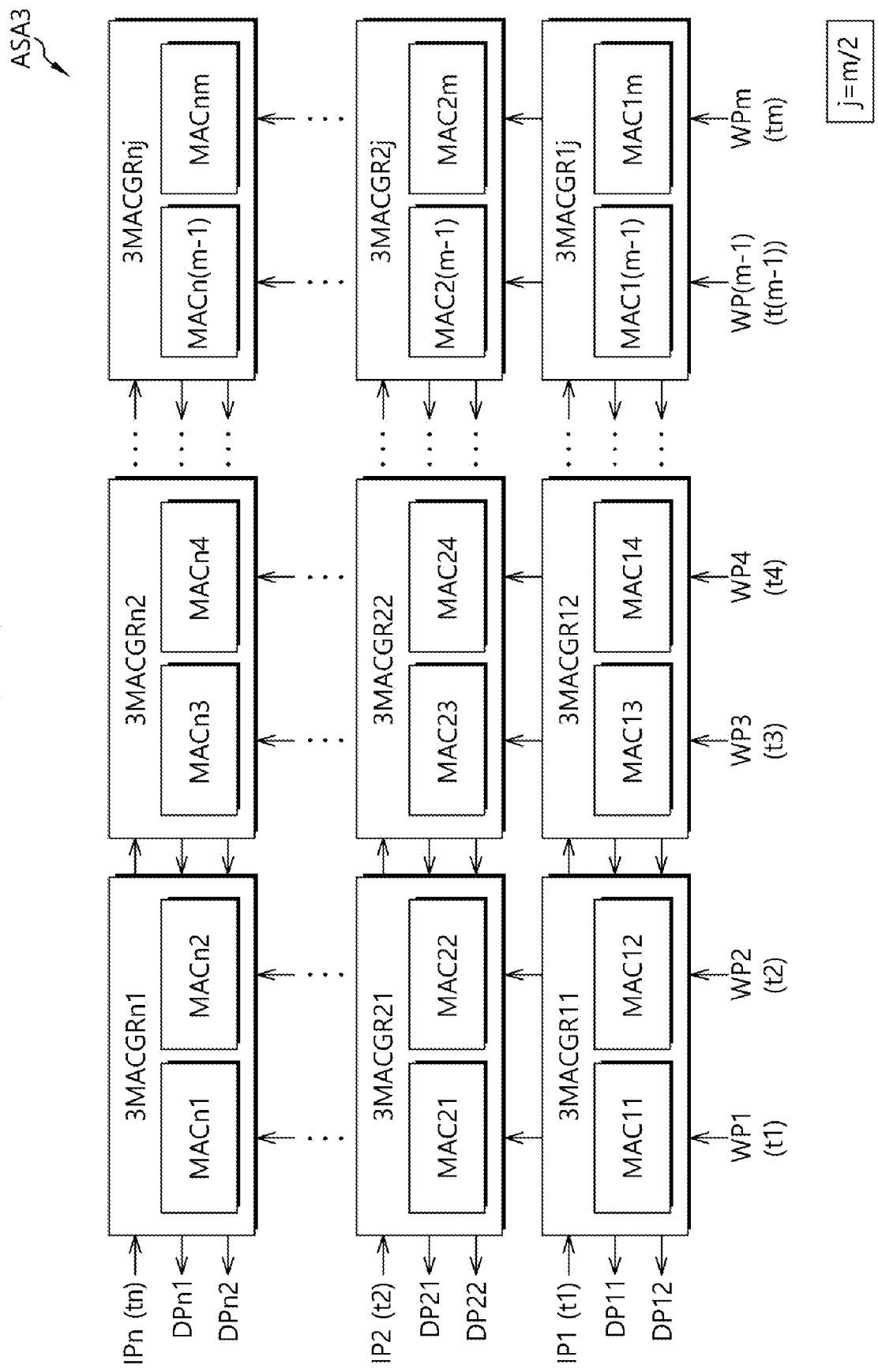
FIG. 11 illustrates a calculation circuit in accordance with an embodiment.

FIG. 11 is a block diagram illustrating a calculation circuit ASA3 in accordance with an embodiment.

The calculation circuit ASA3 may include calculator groups 3MACGR11 to 3MACGR1j, 3MACGR21 to 3MACGR2j, . . . and 3MACGRn1 to 3MACGRnj constituting an advanced systolic array composed of n rows and j columns. Each of the calculator groups 3MACGR11 to 3MACGR1j, 3MACGR21 to 3MACGR2j, . . . and 3MACGRn1 to 3MACGRnj may include two MAC circuits. FIG. 11 illustrates the case in which two MAC circuits are included in each of the calculator groups. In accordance with the present embodiment, however, each of the calculator groups may include three or more MAC circuits.

The calculator groups 3MACGR11 to 3MACGR1j, 3MACGR21 to 3MACGR2j, . . . and 3MACGRn1 to 3MACGRnj may be coupled through data paths IP1 to IPn, drain paths DP11 to DPn1 and DP12 to DPn2, and weight paths WP1 to WPm. Each of the n rows may be coupled to one corresponding data path among the data paths IP1 to IPn. Each of the n rows may be coupled to one corresponding drain paths among the drain paths DP11 to DPn1 and one corresponding drain paths among the drain paths DP12 to DPn2. Each of the j columns may be coupled to two corresponding weight paths among the weight paths WP1 to WPm.

FIG. 11 also illustrates times t1 to tn at which data value sets start to be inputted to the data paths IP1 to IPn. For example, the calculator group 3MACGR11 may start to receive a data value set from the data path IP1 at the time t1. Then, the calculator group 3MACGR11 may propagate a data value to the calculator group 3MACGR12 through the data path IP1 at the next time t2.

Furthermore, FIG. 11 also illustrates times t1 to tm at which weight value sets start to be inputted to the weight paths WP1 to WPm. For example, the calculator group 3MACGR11 may start to receive a weight value set from the weight path WP1 at the time t1, and propagate a weight value to the calculator group 3MACGR21 through the weight path WP1 at the time t2. In addition, the calculator group 3MACGR11 may start to receive a weight value set from the weight path WP2 at the time t2, and propagate a weight value to the calculator group 3MACGR21 through the weight path WP2 at the time t3.

Drain value sets generated in the rows may start to be outputted from the first calculator groups 3MACGR11 to 3MACGRn1 of the respective rows through the drain paths DP11 to DPn1 and DP12 to DPn2 at the same time. As will be described below, the two MACs of each of the calculator groups may generate two drain values, respectively, and each of the rows may output two drain value sets through two drain paths at the same time.

Although not illustrated, the calculation circuit ASA3 may further include a control unit for controlling the operations of the calculator groups 3MACGR11 to 3MACGR1j, 3MACGR21 to 3MACGR2j, . . . and 3MACGRn1 to 3MACGRnj through control signals.

Figure 12:
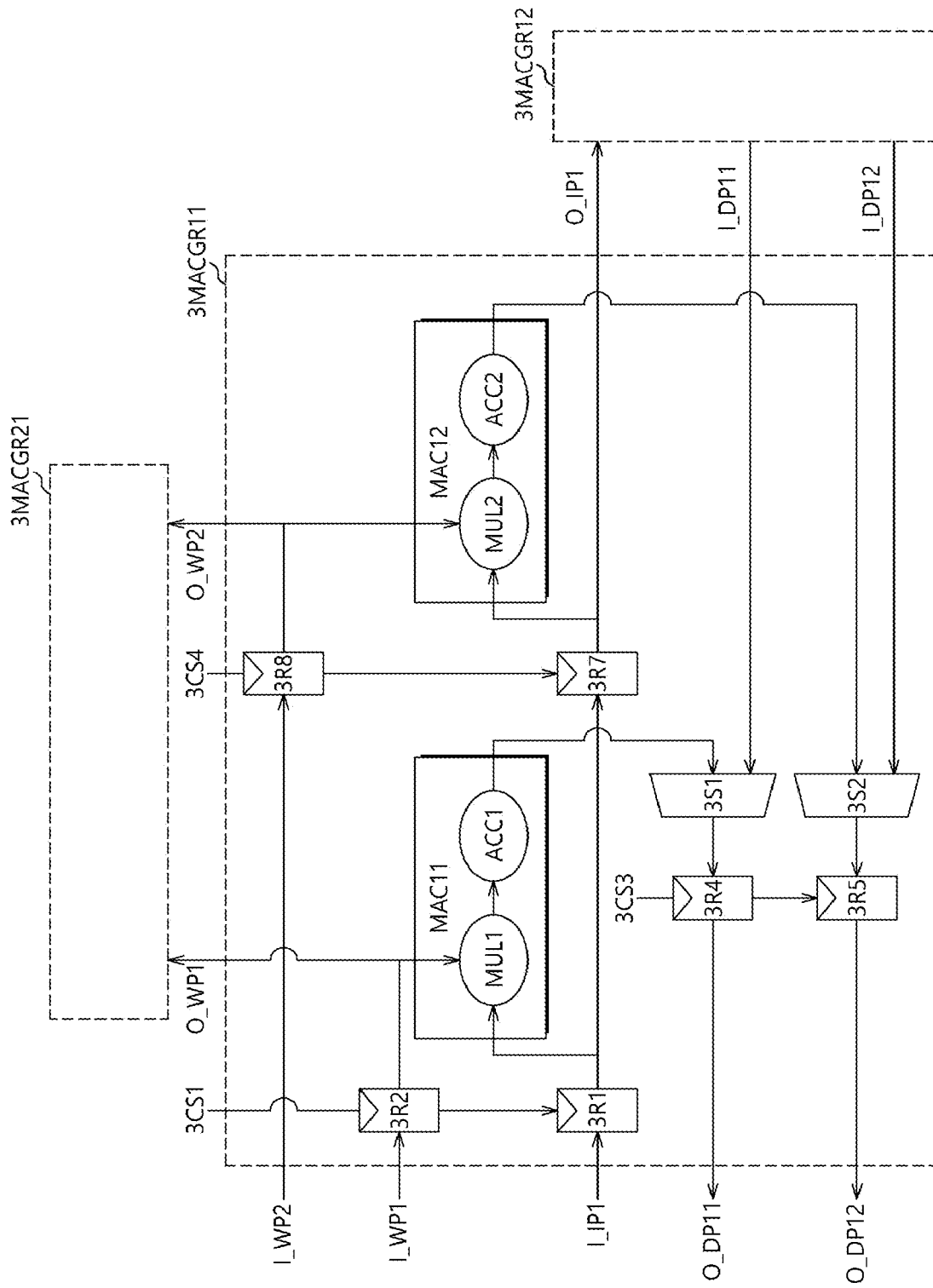
FIG. 12 illustrates a calculator group of FIG. 11 in detail in accordance with the present embodiment.

FIG. 12 is a diagram illustrating the calculator group 3MACGR11 of FIG. 11 in accordance with the present embodiment in detail.

Referring to FIG. 12, an input data path I_IP1 and an output data path O_IP1 may be included in the data path IP1 of FIG. 11. A first input weight path I_WP1 and a first output weight path O_WP1 may be included in the weight path WP1 of FIG. 11. A second input weight path I_WP2 and a second output weight path O_WP2 may be included in the weight path WP2 of FIG. 11. A first input drain path I_DP11 and a first output drain path O_DP11 may be included in the drain path DP11 of FIG. 11. A second input drain path I_DP12 and a second output drain path O_DP12 may be included in the drain path DP12 of FIG. 11.

The calculator group 3MACGR11 may include first and second MAC circuits MAC11 and MAC12, storage units 3R1, 3R2, 3R4, 3R5, 3R7 and 3R8, and selection units 3S1 and 3S2. The first MAC circuit MAC11 may include a first multiplier MUL1 and a first accumulator ACC1. The second MAC circuit MAC12 may include a second multiplier MUL2 and a second accumulator ACC2.

The storage unit 3R1 may receive a data value from the input data path I_IP1, store the received data value therein, and output the stored data value to the first multiplier MUL1 and the storage unit 3R7 in response to a control signal 3CS1.

The storage unit 3R2 may receive a weight value from the first input weight path I_WP1, store the received weight value therein, and output the stored weight value to the first multiplier MUL1 and the first output weight path O_WP1 in response to the control signal 3CS1. The weight value outputted to the first output weight path O_WP1 may be propagated to the calculator group 3MACGR21.

The storage units 3R1 and 3R2 may simultaneously output values, received at the previous time, at the subsequent time in response to the control signal 3CS1.

The storage unit 3R7 may receive a data value from the storage unit 3R1, store the received data value therein, and output the stored data value to the second multiplier MUL2 and the output data path O_IP1 in response to a control signal 3CS4. The data value outputted to the output data path O_IP1 may be propagated to the calculator group 3MACGR12.

The storage unit 3R8 may receive a weight value from the second input weight path I_WP2, store the received weight value therein, and output the stored weight value to the second multiplier MUL2 and the second output weight path O_WP2 in response to a control signal 3CS4. The weight value outputted to the second output weight path O_WP2 may be propagated to the calculator group 3MACGR21.

The storage units 3R7 and 3R8 may simultaneously output values, received at the previous time, at the subsequent time in response to the control signal 3CS4.

The first multiplier MUL1 may receive the data value outputted from the storage unit 3R1 and the weight value outputted from the storage unit 3R2, multiply the received values, and output the multiplication result to the first accumulator ACC1. The first accumulator ACC1 may generate a first drain value by receiving and accumulating the outputs of the first multiplier MUL1, and output the first drain value to the selection unit 3S1.

The second multiplier MUL2 may receive the data value outputted from the storage unit 3R7 and the weight value outputted from the storage unit 3R8, multiply the received values, and output the multiplication result to the second accumulator ACC2. The second accumulator ACC2 may generate a second drain value by receiving and accumulating the outputs of the second multiplier MUL2, and output the second drain value to the selection unit 3S2.

The selection unit 3S1 may output the first drain value, outputted from the first accumulator ACC1, to the storage unit 3R4. After outputting the first drain value of the first accumulator ACC1, the selection unit 3S1 may sequentially output subsequent drain values, propagated from the calculator group 3MACGR12 through the first input drain path I_DP11, to the storage unit 3R4. The storage unit 3R4 may receive the drain value outputted from the selection unit 3S1, store the received drain value therein, and output the stored drain value to the first output drain path O_DP11 in response to a control signal 3CS3.

The selection unit 3S2 may output the second drain value, outputted from the second accumulator ACC2, to the storage unit 3R5. After outputting the second drain value of the second accumulator ACC2, the selection unit 3S2 may sequentially output subsequent drain values, propagated from the calculator group 3MACGR12 through the second input drain path I_DP12, to the storage unit 3R5. The storage unit 3R5 may receive the drain value outputted from the selection unit 3S2, store the received drain value therein, and output the stored drain value to the second output drain path O_DP12 in response to the control signal 3CS3.

The storage units 3R4 and 3R5 may simultaneously output the drain values stored therein in response to the control signal 3CS3.

The other calculator groups of FIG. 11 may be configured in a similar manner to the calculator group 3MACGR11. However, the last calculator groups 3MACGR1j to 3MACGRnj of the rows may not include the output data path O_IP1. Furthermore, the last calculator groups 3MACGR1j to 3MACGRnj of the rows may not include the first input drain path I_DP11, the second input drain path I_DP12, and the selection units 3S1 and 3S2, and the first and second drain values outputted from the first and second accumulators ACC1 and ACC2 may be directly inputted to the storage units 3R4 and 3R5, respectively. Furthermore, the last calculator groups 3MACGRn1 to 3MACGRnj of the columns may not include the first output weight path O_WP1 and the second output weight path O_WP2.

Figure 13:
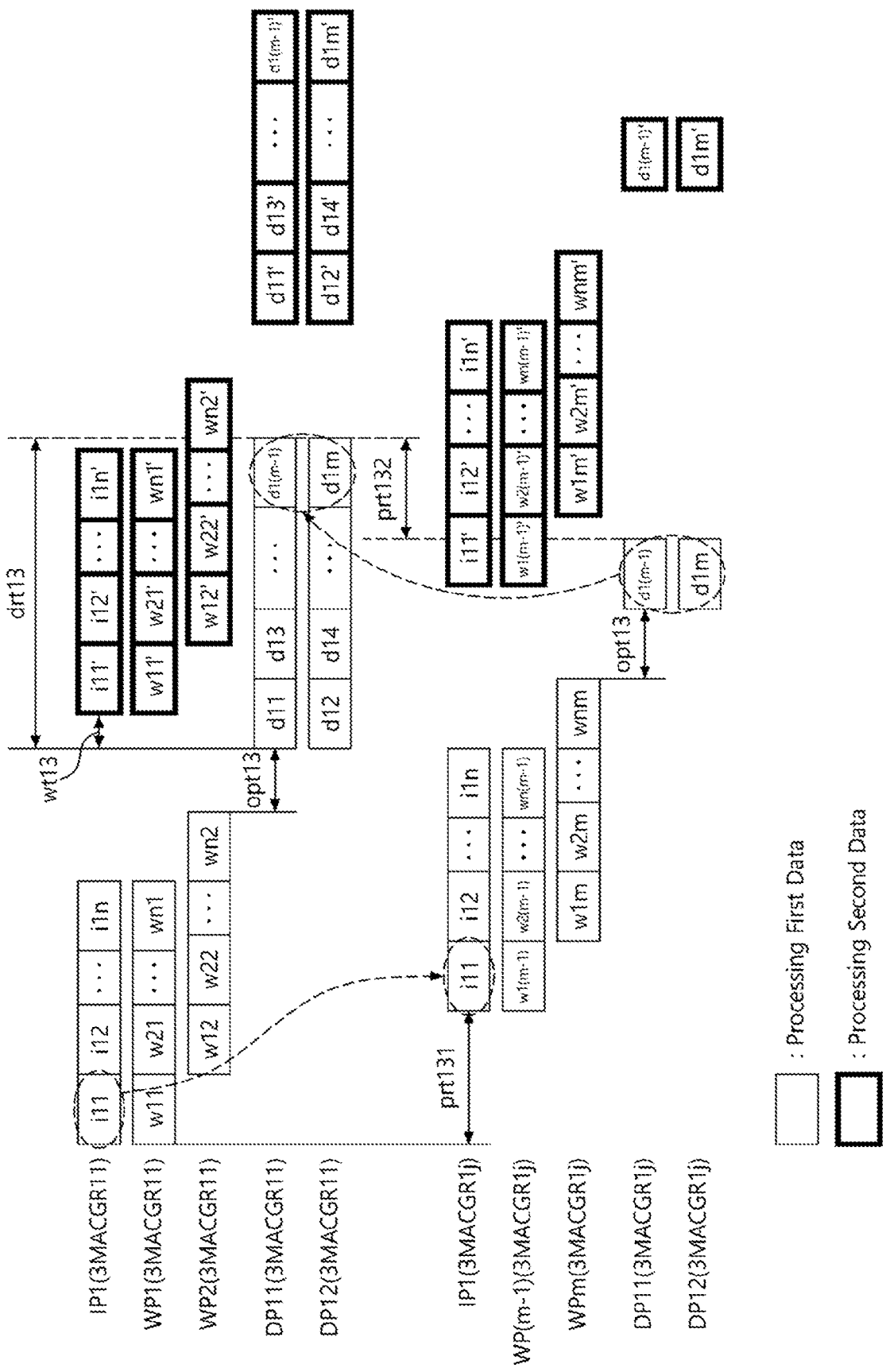
FIG. 13 is a timing diagram illustrating operations of a first calculator group and a $j^{th}$ calculator group which are included in a first row of the calculation circuit of FIG. 11 in accordance with the present embodiment.

FIG. 13 is a timing diagram illustrating operations of the first calculator group 3MACGR11 and the $j^{th}$ calculator group 3MACGR1j which are included in the first row of the calculation circuit ASA3 of FIG. 11 in accordance with the present embodiment.

Referring to FIGS. 11 to 13, n data values i11 to i1n may be sequentially inputted to the first calculator group 3MACGR11 through the data path IP1. Simultaneously, n weight values w11 to wn1 may be sequentially inputted to the first calculator group 3MACGR11 through the weight path WP1, and n weight values w12 to wn2 may be sequentially inputted to the first calculator group 3MACGR11 through the weight path WP2. The data values i11 to i1n may constitute a data value set corresponding to the first row, and the weight values w11 to wn1 and the weight values w12 to wn2 may constitute weight value sets corresponding to the first column, respectively.

When the weight values w11 to wn1 start to be inputted to the first calculator group 3MACGR11 at the time t1, the weight values w12 to wn2 may start to be inputted at the time t2 later by one input period than the time t1. Therefore, the second MAC circuit MAC12 may generate the drain value d12 after one input period since the first MAC circuit MAC11 of the first calculator group 3MACGR11 generated the drain value d11. Since the first calculator group 3MACGR11 is coupled to two drain paths DP11 and DP12, the drain values d11 and d12 may be outputted through the drain paths DP11 and DP12, respectively, after the operation time opt13 has elapsed since the last weight value wn2 was received by the first calculator group 3MACGR11.

A data propagation time prt131 may indicate the time required until the data value i11 is propagated from the first calculator group 3MACGR11 to the $j^{th}$ calculator group 3MACGR1j. The data propagation time prt131 may be earlier by one input period than the data propagation time prt21 of FIG. 4. That is because, in FIG. 13, the data value i11 may be inputted to the first calculator group 3MACGR11 at the time t1 that the weight value w11 is inputted, and propagated to the $j^{th}$ calculator group 3MACGR1j at the time t(m−1) that the weight value w1(m−1) is inputted. In FIG. 2B, however, the data value i11 is inputted to the first calculator group MACGR11 at the time t1 that the weight value w11 is inputted, and propagated to the $j^{th}$ calculator group MACGR1j at the time tm that the weight value w1m is inputted.

The data values i11 to i1n may be sequentially propagated to the first to $j^{th}$ calculator groups 3MACGR11 to 3MACGR1j through the data path IP1. Simultaneously to the inputting of the data values i11 to i1n to the $j^{th}$ calculator group 3MACGR1j, n weight values w1(m−1) to wn(m−1) may be sequentially inputted to the $j^{th}$ calculator group 3MACGR1j through the weight path WP(m−1), and beginning one input period later, n weight values w1m to wnm may be sequentially inputted to the $j^{th}$ calculator group 3MACGR1j through the weight path WPm. The weight values w1(m−1) to wn(m−1) and the weight values w1m to wnm may constitute the weight value sets corresponding to the $j^{th}$ column, respectively.

When the weight values w1(m−1) to wn(m−1) start to be inputted to the $j^{th}$ calculator group 3MACGR1j at the time t(m−1), the weight values w1m to wnm may start to be inputted at the time tm later by one input period than the time t(m−1). Therefore, the second MAC circuit MAC1m may generate the drain value d1m after one input period since the first MAC circuit MAC1(m−1) of the $j^{th}$ calculator group 3MACGR1j generated the drain value d1(m−1). Since the $j^{th}$ calculator group 3MACGR1j is coupled to two drain paths DP11 and DP12, the drain values d1(m−1) and d1m may be outputted through the drain paths DP11 and DP12, respectively, after the operation time opt13 has elapsed since the last weight value wnm was received by the $j^{th}$ calculator group 3MACGR1j.

A drain propagation time prt132 may indicate the time required until the drain values d1(m−1) and d1m are propagated from the $j^{th}$ calculator group 3MACGR1j through the drain paths DP11 and DP12 and then outputted from the first calculator group 3MACGR11. In this case, the drain propagation time prt132 may be ½ of the drain propagation time prt22 of FIG. 4 for same values of m. That is, unlike the configuration of FIG. 2A in which one drain value set constituted by the drain values d11 to d1m is propagated through one drain path DP1, two drain value sets constituted by the drain values d11 to d1(m−1) and the drain values d12 to d1m, respectively, may be propagated through two drain paths DP11 and DP12. As a result, m drain values in the systolic array of FIG. 5 may pass two times faster than in the systolic array of FIG. 2A.

The first calculator group 3MACGR11 may receive the second data after a waiting time wt13 has elapsed since the operation of the first calculator group 3MACGR11 was completed. The waiting time wt13 may be set so that the drain values d11' and d1m' of the second data start to be outputted after all of the drain values d11 to d1m of the first data are outputted from the first calculator group 3MACGR11. In other words, the waiting time wt13 may be set so that no drain conflict occurs.

When the drain propagation time prt132 becomes shorter than the drain propagation time prt22 of FIG. 4, the output operations of the drain values d11 to d1m in the first calculator group 3MACGR11 may be advanced. In this case, the drain time drt13 may become shorter than the drain time drt2 of FIG. 4, and the waiting time wt13 may become shorter than the waiting time wt4 of FIG. 4. Therefore, the calculation circuit ASA3 may operate with high operation efficiency and high hourly throughput compared to the circuit SA2 shown in FIG. 2.

Figure 14:
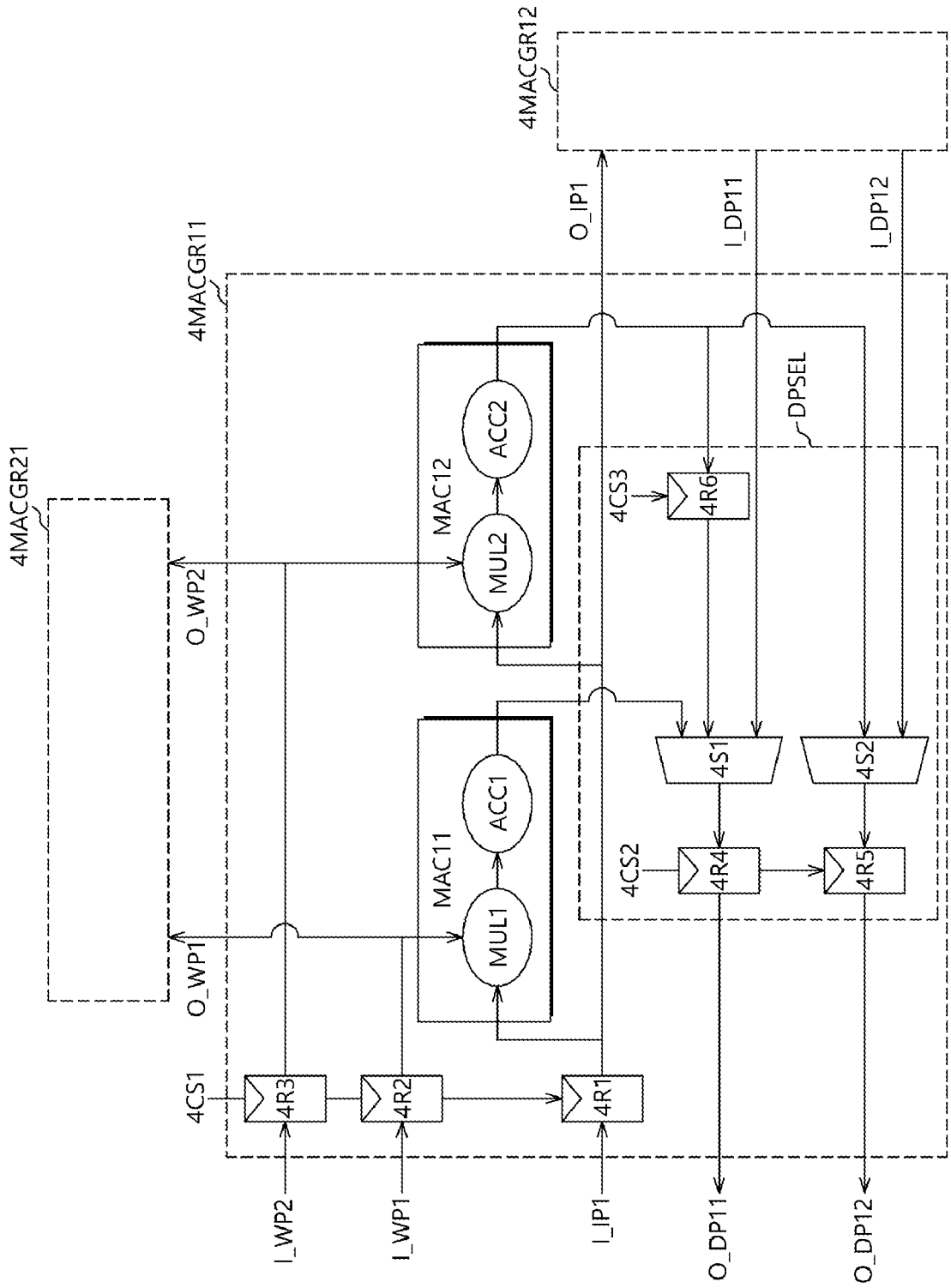
FIG. 14 illustrates a calculator group in accordance with the present embodiment in detail.

FIG. 14 is a diagram illustrating a calculator group 4MACGR11 in accordance with the present embodiment in detail.

Referring to FIG. 14, the calculator groups of a calculation circuit may be configured in substantially the same manner as the calculator group 4MACGR11. In this case, the calculation circuit may have substantially the same configuration as the calculation circuit ASA1 illustrated in FIG. 5. An input data path I_IP1 and an output data path O_IP1 may be included in the data path IP1 of FIG. 5. A first input weight path I_WP1 and a first output weight path O_WP1 may be included in the weight path WP1 of FIG. 5. A second input weight path I_WP2 and a second output weight path O_WP2 may be included in the weight path WP2 of FIG. 5. A first input drain path I_DP11 and a first output drain path O_DP11 may be included in the drain path DP11 of FIG. 5. A second input drain path I_DP12 and a second output drain path O_DP12 may be included in the drain path DP12 of FIG. 5.

The calculator group 4MACGR11 may include first and second MAC circuits MAC11 and MAC12, storage units 4R1 to 4R6 and selection units 4S1 and 4S2. The first MAC circuit MAC11 may include a first multiplier MUL1 and a first accumulator ACC1. The second MAC circuit MAC12 may include a second multiplier MUL2 and a second accumulator ACC2. The first and second MACs MAC11 and MAC12 may be configured in substantially the same manner as the first and second MAC circuits MAC11 and MAC12 of FIG. 6. The storage units 4R1 to 4R3 may be configured in substantially the same manner as the storage units R1 to R3 of FIG. 6.

The storage units 4R4 to 4R6 and the selection units 4S1 and 4S2 may be included in a drain path selection unit DPSEL.

The drain path selection unit DPSEL may selectively use the first and second input drain paths I_DP11 and I_DP12 and the first and second output drain paths O_DP11 and O_DP12 according to whether the calculator group 4MACGR11 is operating in a high performance mode or a low power mode.

Specifically, the drain path selection unit DPSEL may control the calculator group 4MACGR11 to operate through two drain paths in the high performance mode. That is, in the high performance mode, the drain path selection unit DPSEL may use all of the first and second input drain paths I_DP11 and I_DP12 and the first and second output drain paths O_DP11 and O_DP12.

The drain path selection unit DPSEL may control the calculator group 4MACGR11 to operate through one drain path in the low power mode. That is, in the low power mode, the drain path selection unit DPSEL may use only the first input drain path I_DP11 and the first output drain path O_DP11, without using the second input drain path I_DP12 and the second output drain path O_DP12.

The operation method of the drain path selection unit DPSEL will be described in detail as follows. In the low power mode, the storage unit 4R6 may receive a second drain value outputted from the second accumulator ACC2 and store the received second drain value therein. The storage unit 4R6 may output the stored second drain value to the selection unit 4S1 in response to a control signal 4CS3.

In the low power mode, the selection unit 4S1 may output a first drain value, outputted from the first accumulator ACC1, to the storage unit 4R4. After outputting the first drain value of the first accumulator ACC1, the selection unit 4S1 may output the second drain value, outputted from the storage unit 4R6, to the storage unit 4R4. After outputting the second drain value of the storage unit 4R6, the selection unit 4S1 may sequentially output subsequent drain values, propagated from the calculator group 4MACGR12 through the first input drain path I_DP11, to the storage unit 4R4. The storage unit 4R4 may receive the drain value outputted from the selection unit 4S1, store the received drain value therein, and output the stored drain value to the first output drain path O_DP11 in response to a control signal 4CS2.

In the low power mode, the second input drain path I_DP12 and the second output drain path O_DP12 may not be used, and the selection unit 4S2 and the storage unit 4R5 may not be operated.

Therefore, the operation method of the calculation circuit in the low power mode may be performed in substantially the same manner as the operation method of the calculation circuit ASA2 of FIG. 8 as described with reference to FIG. 10.

In the high performance mode, the storage unit 4R6 may not be operated.

In the high performance mode, the selection unit 4S1 may output the first drain value, outputted from the first accumulator ACC1, to the storage unit 4R4. After outputting the first drain value of the first accumulator ACC1, the selection unit 4S1 may sequentially output subsequent drain values, propagated from the calculator group 4MACGR12 through the first input drain path I_DP11, to the storage unit 4R4. The storage unit 4R4 may receive the drain value outputted from the selection unit 4S1, store the received drain value therein, and output the stored drain value to the first output drain path O_DP11 in response to the control signal 4CS2.

In the high performance mode, the selection unit 4S2 may output the second drain value, outputted from the second accumulator ACC2, to the storage unit 4R5. After outputting the second drain value of the second accumulator ACC2, the selection unit 4S2 may sequentially output subsequent drain values, propagated from the calculator group 4MACGR12 through the second input drain path I_DP12, to the storage unit 4R5. The storage unit 4R5 may receive the drain value outputted from the selection unit 4S2, store the received drain value therein, and output the stored drain value to the second output drain path O_DP12 in response to the control signal 4CS2.

Therefore, the operation method of the calculation circuit in the high performance mode may be performed in substantially the same manner as the operation method of the calculation circuit ASA1 of FIG. 5 as described with reference to FIG. 7.

The calculation groups of the calculation circuit may simultaneously operate in the same operation mode.

Figure 15:
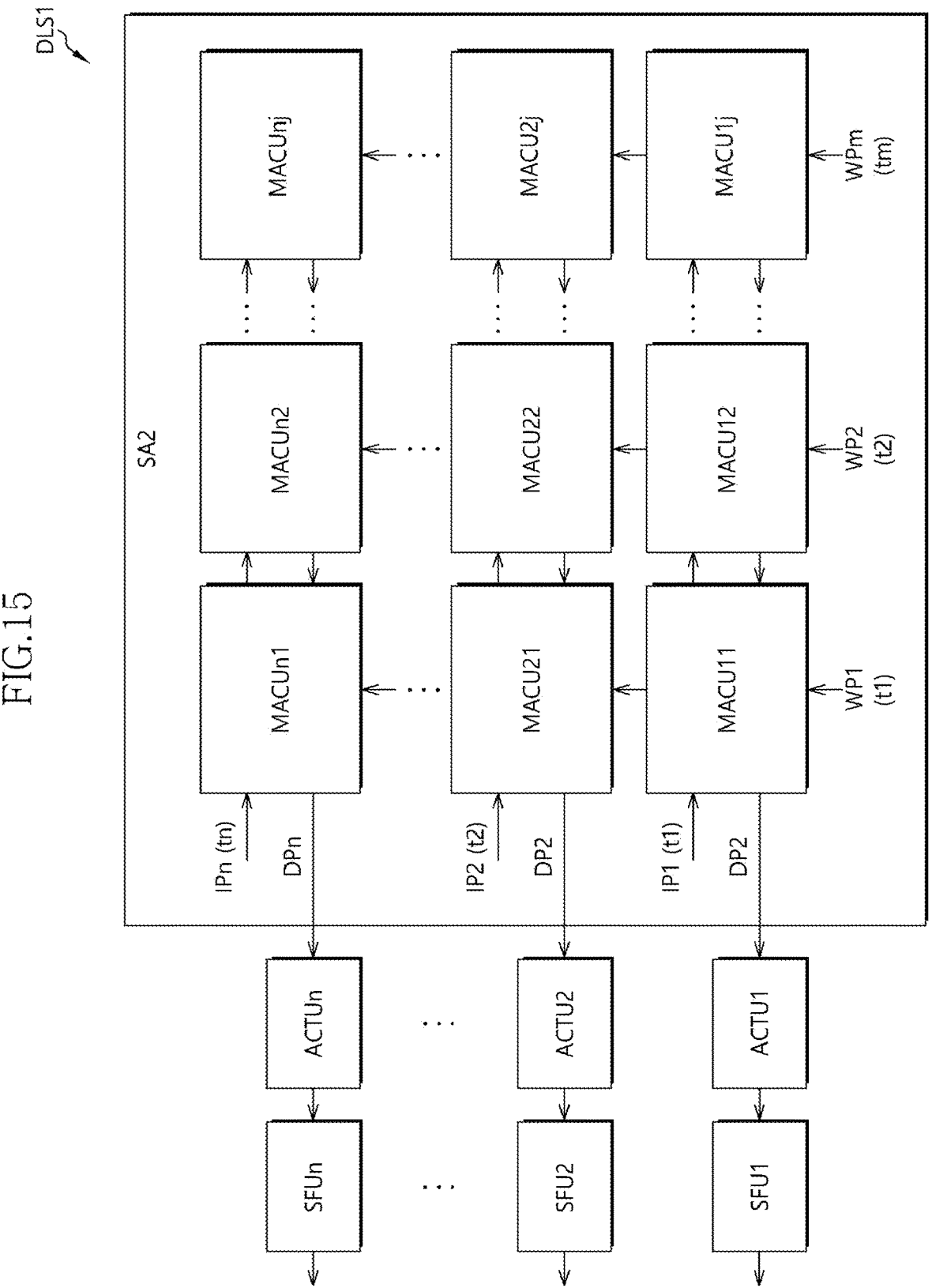
FIG. 15 illustrates a deep learning system.

FIG. 15 is a block diagram illustrating a deep learning system DLS1.

Referring to FIG. 15, the deep learning system DSL1 may include a calculation circuit SA2, activation units ACTU1 to ACTUn and special units SFU1 to SFUn. The calculation circuit SA2 may be configured in substantially the same manner as the calculation circuit SA2 illustrated in FIG. 2A, for example.

The activation units ACTU1 to ACTUn may correspond to the respective rows of the systolic array of the calculation circuit SA2. The activation units ACTU1 to ACTUn may be coupled to drain paths DP1 to DPn, respectively. Each of the activation units ACTU1 to ACTUn may perform an activation function calculation (such as, for example, a step function calculation, a logistic function calculation, a hyperbolic tangent function calculation, a rectified linear function calculation, or the like) based on a drain value set outputted from the corresponding drain path, and output one or more activation function values.

The special units SFU1 to SFUn may be coupled to the respective activation units ACTU1 to ACTUn. Each of the special units SFU1 to SFUn may perform a special function calculation based on the one or more activation function values outputted from the corresponding activation unit (such as, for example, a weighted input function calculation), and output special function values.

Figure 16:
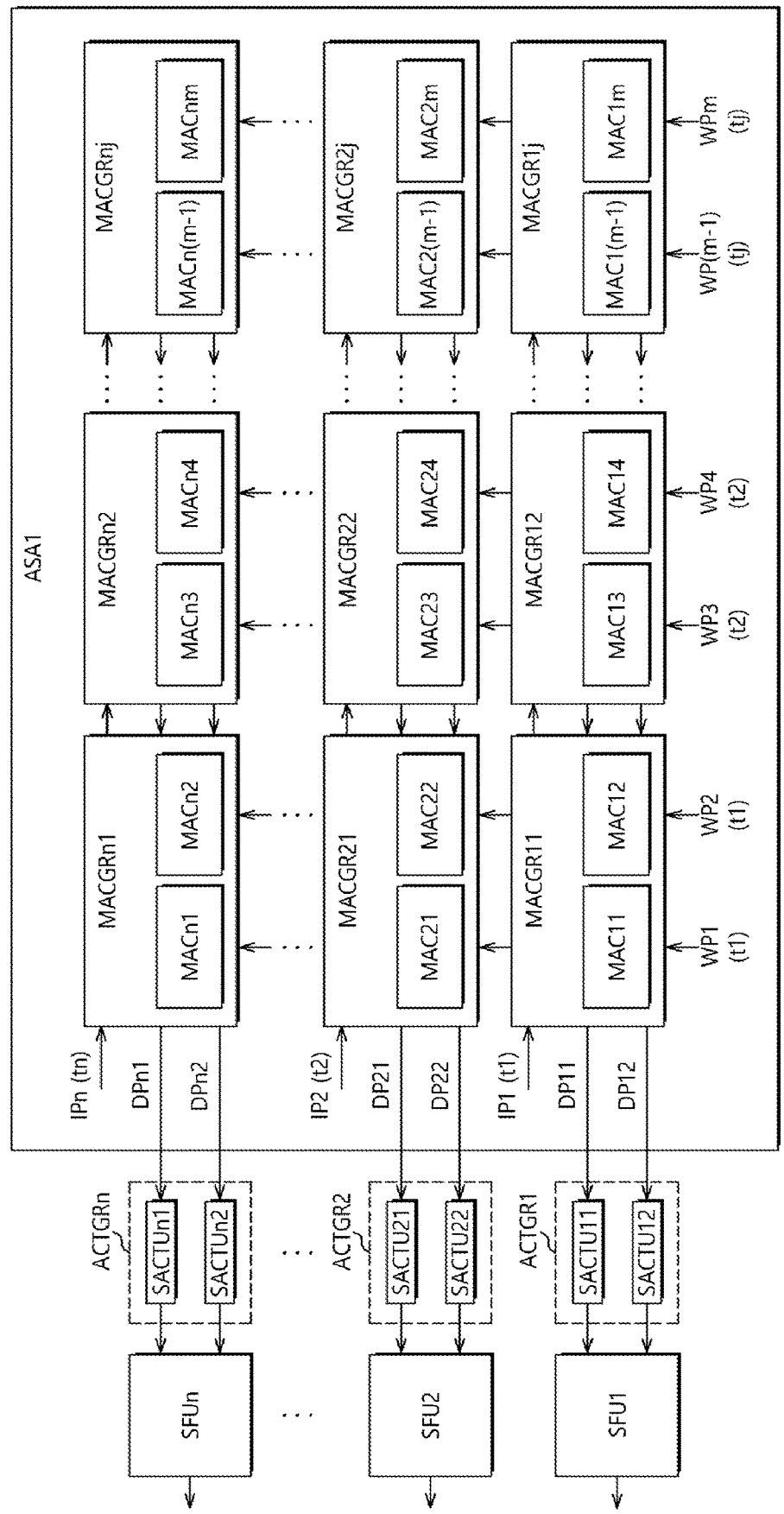
FIG. 16 illustrates an advanced deep learning system in accordance with an embodiment.

FIG. 16 is a block diagram illustrating an advanced deep learning system ADLS1 in accordance with an embodiment.

Referring to FIG. 16, the advanced deep learning system ADLS1 may include a calculation circuit ASA1, activation groups ACTGR1 to ACTGRn and special units SFU1 to SFUn. In an embodiment, the advanced deep learning system ADLS1 may include the calculation circuit ASA1 illustrated in FIG. 5, for example. However, embodiments are not limited thereto, and in other embodiments, the advanced deep learning system ADLS1 may include, for example, the calculation circuit ASA3 of FIG. 11.

The activation groups ACTGR1 to ACTGRn may correspond to the respective rows of the advanced systolic array of the calculation circuit ASA1. Each of the activation groups ACTGR1 to ACTGRn may include sub activation units. The number of sub activation units included in each of the activation groups ACTGR1 to ACTGRn may be equal to the number of drain paths coupled to each of the rows of the systolic array.

For example, the activation group ACTGR1 may include sub activation units SACTU11 and SACTU12. The sub activation units SACTU11 and SACTU12 may be coupled to the drain paths DP11 and DP12 of the first row of the advanced systolic array, respectively. The sub activation units SACTU11 and SACTU12 may perform an activation function calculation based on drain value sets outputted from the drain paths DP11 and DP12, and output activation function values, respectively. The sub activation units SACTU11 and SACTU12 may perform the same or different activation function calculations. The operation and configuration of the activation group may be applied in the same manner as the other activation groups.

The special units SFU1 to SFUn may be coupled to the respective activation groups ACTGR1 to ACTGRn. Each of the special units SFU1 to SFUn may perform a special function operation based on the activation function values outputted from the corresponding activation group, and output special function values.

Each of the rows of the advanced systolic array of the calculation circuit ASA1 may output two drain value sets through twice as many drain paths than shown in FIG. 15 at the same time. Therefore, the sub activation units SACTU11 and SACTU12 may operate at the same time, and the output latency of the advanced deep learning system ADLS1 may be reduced.

Figure 17:
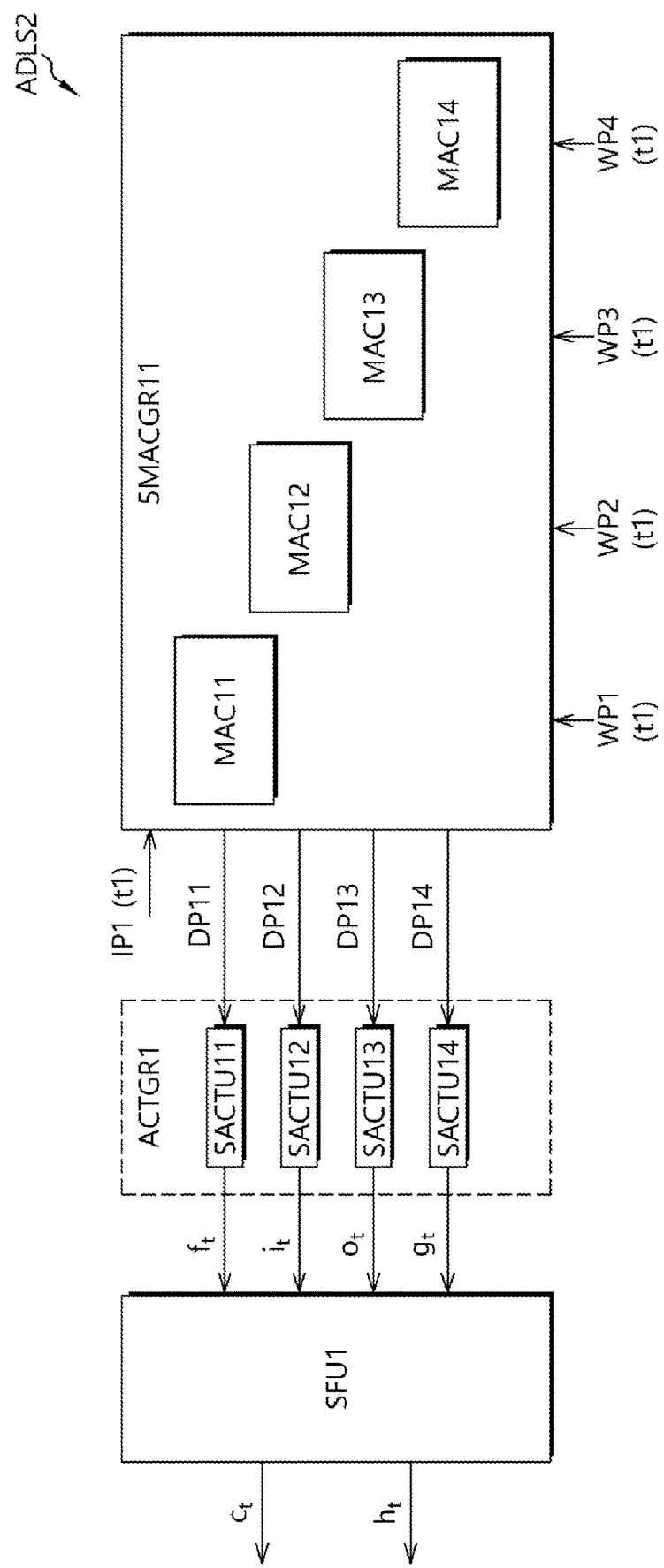
FIG. 17 illustrates an LSTM (Long Short-Term Memory) network to which an advanced deep learning system in accordance with an embodiment is applied.

FIG. 17 is a block diagram illustrating an LSTM (Long Short-Term Memory) network to which an advanced deep learning system ADLS2 in accordance with an embodiment is applied.

The advanced deep learning system ADLS2 may be applied to the LSTM network. In accordance with the present embodiment, the advanced deep learning system ADLS2 may be applied to not only the LSTM network, but also other networks based on RNN (Recurrent Neural Network), such as a GRU (Gated Recurrent Unit).

The advanced deep learning system ADLS2 may include a calculator group 5MACGR11, an activation group ACTGR1 and a special unit SFU1.

The calculator group 5MACGR11 may be a first calculator group of a first row in an advanced systolic array (not illustrated) included in the advanced deep learning system ADLS2. The calculator group 5MACGR11 may be coupled to a data path IP1, drain paths DP11 to DP14 and weight paths WP1 to WP4. The calculator group 5MACGR11 may start to receive a data value set from the data path IP1 at a time t1. The calculator group 5MACGR11 may start to receive weight value sets from the weight paths WP1 to WP4 at the time t1. The calculator group 5MACGR11 may start to output drain value sets through the drain paths DP11 to DP14 at a same time subsequent to the timer t1.

The calculator group 5MACGR11 may include first, second, third, and fourth MAC circuits MAC11. MAC12, MAC13, and MAC14. The first to fourth MAC circuits MAC11 to MAC14 may simultaneously operate in a similar manner to the operations of the first and second MAC circuits MAC11 and MAC12 of FIG. 5.

The activation group ACTGR1 may include sub activation units SACTU11 to SACTU14. The sub activation units SACTU11 to SACTU14 may be coupled to the drain paths DP11 to DP14, respectively. The special unit SFU1 may be coupled to the sub activation units SACTU11 to SACTU14.

The sub activation units SACTU11 to SACTU14 may be operated by the following activation functions F1 to F4 of the LSTM network, and output activation function values ($f_t$, $i_t$, $o_t$, $g_t$), respectively. In the activation functions F1 to F4, W represents a weight matrix, x represents a data value, and b represents a bias vector.

$$f_t = \sigma(W_{xh\_f} \cdot x_t + W_{hh\_f} \cdot h_{t-1} + b_{h\_f}))$$ Function F1

$$i_t = \sigma(W_{xh\_i} \cdot x_t + W_{hh\_i} \cdot h_{t-1} + b_{h\_i})$$ Function F2

$$O_t = \sigma(W_{xh\_o} \cdot x_t + W_{hh\_o} \cdot h_{t-1} + b_{h\_o})$$ Function F3

$$g_t = \tanh(W_{xh\_g} \cdot x_t + w_{hh\_g} \cdot h_{t-1} + b_{h\_g})$$ Function F4

The special unit SFU1 may be operated by the following special functions F5 and F6 of the LSTM network, and output special function values ($c_t$, $h_t$).

$$c_t = f_t \cdot c_{t-1} + i_t \cdot g_t$$ Function F5

$$h_t = o_t \cdot \tanh(c_t)$$ Function F6

Figure 18A:
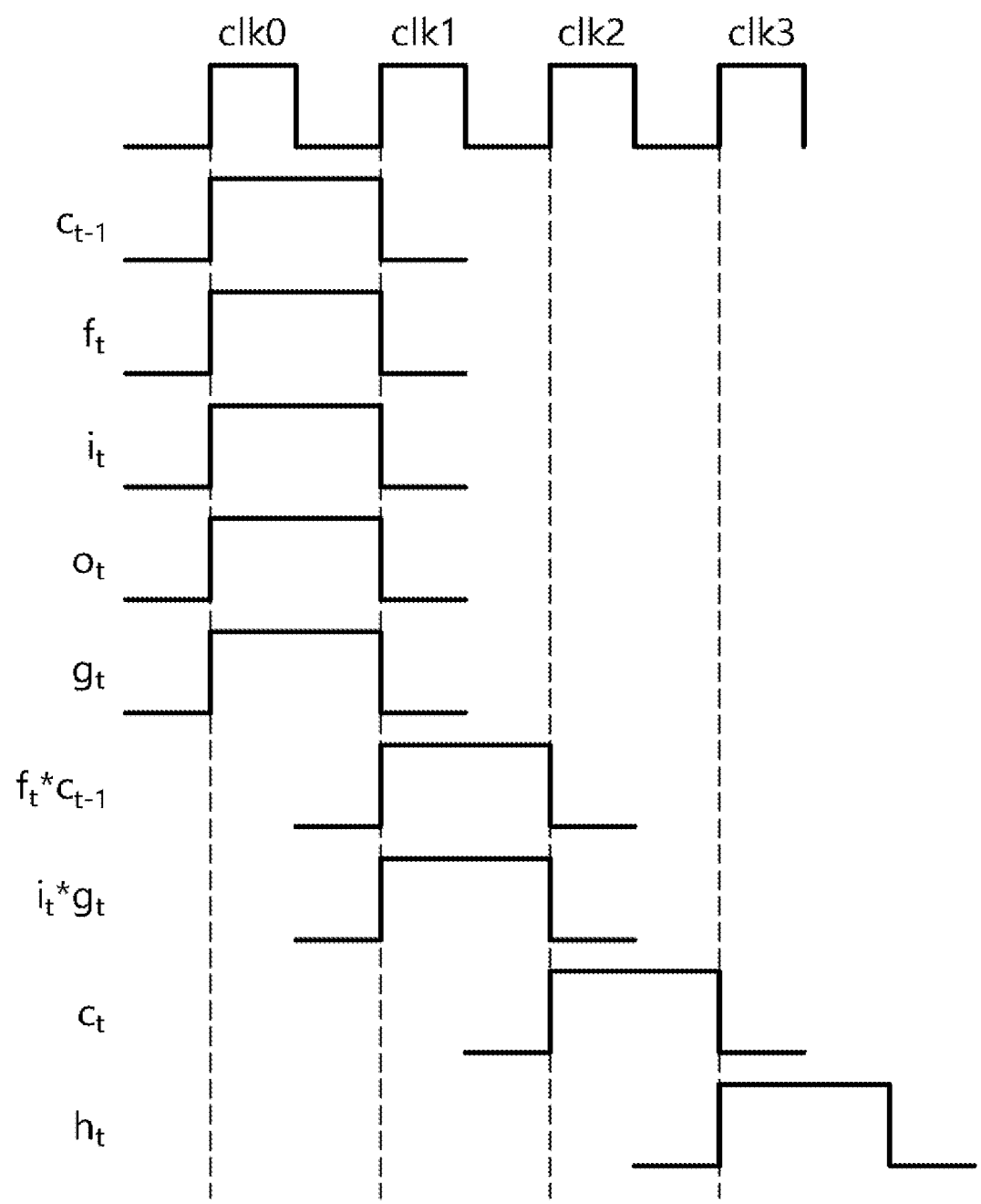
FIG. 18A is an output timing diagram of the LSTM network to which the advanced deep learning system of FIG. 17 is applied.

FIG. 18A is an output timing diagram of the LSTM network to which the advanced deep learning system ADLS2 of FIG. 17 is applied according to an embodiment. FIG. 18B is an output timing diagram of the LSTM network to which the deep learning system DLS1 of FIG. 15 is applied.

First, referring to FIG. 18A, the sub activation units SACTU11 to SACTU14 may operate by receiving the drain value sets through the drain paths DP11 to DP14 at the same time, and thus simultaneously output the activation function values ($f_t$, $i_t$, $o_t$, $g_t$) in a first clock period clk0, based on the activation functions.

Then, in a second clock period clk1, the special unit SFU1 may calculate intermediate values ($f_t * C_{t-1}$, $i_t * g_t$) based on the activation function values ($f_t$, $i_t$, $g_t$) and the previous special function value $C_{t-1}$.

In a third clock period clk2, the special unit SFU1 may calculate the special function value $c_t$ by applying the intermediate values ($f_t * C_{t-1}$, $i_t * g_t$) to the special function.

In a fourth clock period clk3, the special unit SFU1 may calculate a special function value $h_t$ by applying the activation function value $o_t$ and the special function value $C_t$ to the special function.

Referring to FIG. 18B, the activation unit may sequentially output the activation function values ($f_t$, $i_t$, $o_t$, $g_t$) based on the activation functions in clock periods clk, outputting $f_t$ in a first clock period clk0, outputting $i_t$ in a second clock period clk1, outputting $o_t$ in a third clock period clk2, and outputting $g_t$ in a fourth clock period clk3.

In the second clock period clk1, the special function unit may calculate an intermediate value ($f_t * C_{t-1}$) based on the activation function values $f_t$ and the previous special function value $C_{t-1}$.

In the fourth clock period clk3, the special function unit may calculate an intermediate value ($i_t * g_t$) based on the activation function values ($i_t$, $g_t$).

In the fifth clock period clk4, the special function unit may calculate the special function value $c_t$ by applying the intermediate values ($f_t * C_{t-1}$, $i_t * g_t$) to the special function.

In the sixth clock period clk5, the special function unit may calculate the special function value $h_t$ by applying the activation function value $o_t$ and the special function value $C_t$ to the special function.

In short, the sub activation units SACTU11 to SACTU14 of FIG. 17 may simultaneously operate by receiving four drain value sets through four drain paths DP11 to DP14 at the same time. Therefore, the output latency of the advanced deep learning system ADLS2 may be reduced compared to a circuit such as that shown in FIG. 15.

Figure 19:
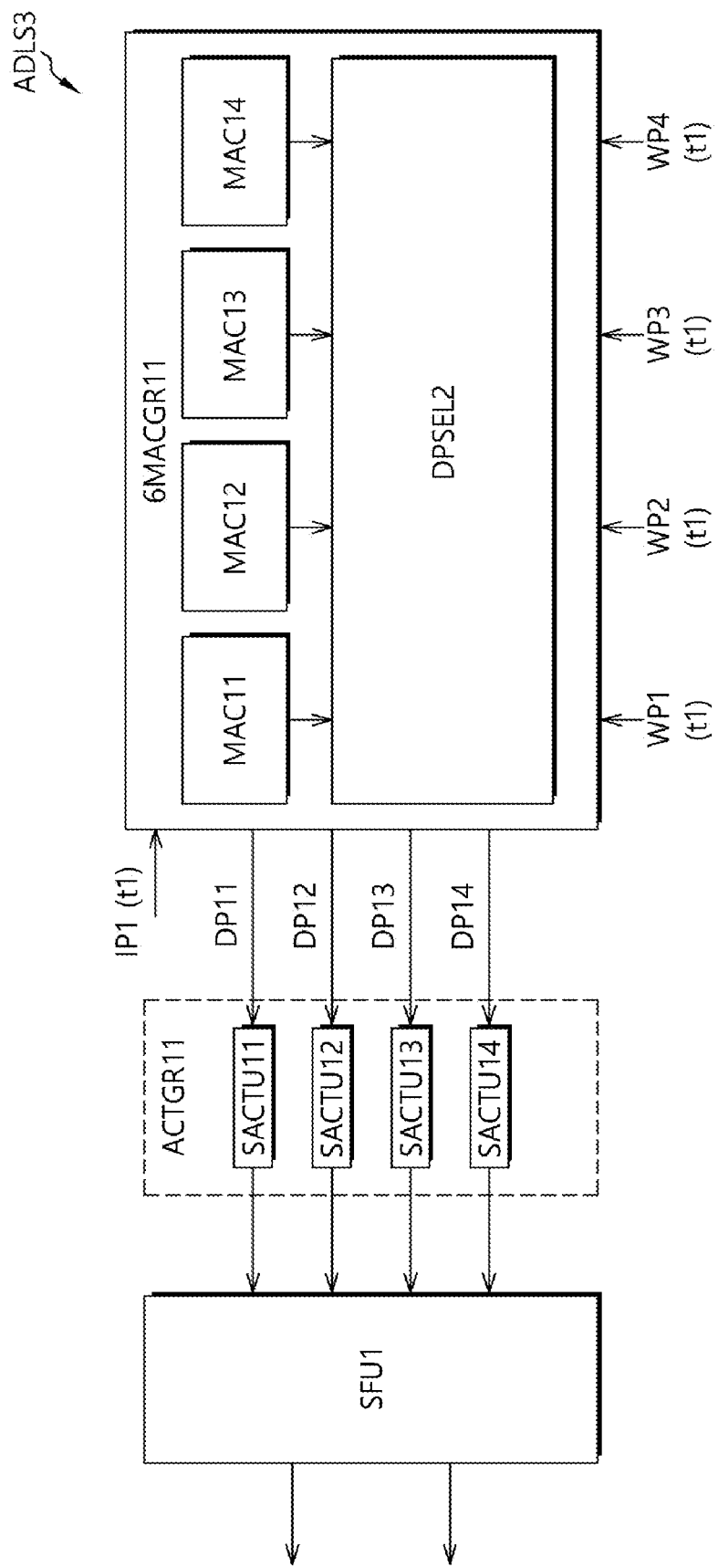
FIG. 19 illustrates an advanced deep learning system including a drain path selection unit in accordance with an embodiment.

FIG. 19 is a block diagram illustrating an advanced deep learning system ADLS3 including a drain path selection unit DPSEL2 in accordance with an embodiment.

Referring to FIG. 19, a calculator group 6MACGR11 may further include a drain path selection unit DPSEL2, compared to the calculator group 5MACGR11 of FIG. 17. The drain path selection unit DPSEL2 may receive outputs of the first to fourth calculators MAC11 to MAC14, and output drain values through only one or more selected drain paths among the drain paths DP11 to DP14. The drain path selection unit DPSEL2 may operate in a similar manner to the drain path selection unit DPSEL of FIG. 14.

Specifically, the drain path selection unit DPSEL2 may use all of the drain paths DP11 to DP14 in the high performance mode. The high performance mode may include an LSTM operation, for example. For another example, the high performance mode may include the case in which a relatively small number of MAC operations are performed.

In the low power mode, the drain path selection unit DPSEL2 may use only the drain path DP11, without using the drain paths DP12 to DP14, for example. In this case, in the low power mode, only the sub activation unit SACTU11 may operate, and the sub activation units SACTU12 to SACTU14 may not operate. The low power mode may include an MLP (Multi-Layer Perceptron) operation, for example. For another example, the low power mode may include the case in which a relatively large number of MAC operations are performed.

Although not illustrated, the calculator group 6MACGR11 may be coupled to the calculator groups having substantially the same structure through the same row. In this case, the drain path selection units of the calculator groups in the same row may operate in the same operation mode.

While various embodiments have been described above, $i_t$ will be understood to those skilled in the art that the embodiments described are examples only. Accordingly, the operating method of a data storage device described herein should not be limited based on the described embodiments.

What is claimed is:

1. A calculation circuit comprising:
a plurality of calculator groups constituting a systolic array composed of a plurality of rows and a plurality of columns,
wherein calculator groups included in each row of the plurality of rows propagate a data value set in a data propagation direction,
wherein each calculator group of the calculator groups included in the each row receives the data value set through a single input data path, and comprises a plurality of MAC (Multiplier-Accumulator) circuits and a drain path selection circuit,
wherein the plurality of MAC circuits receive a data value included in the data value set, respectively, and generate drain values, respectively, each of the drain values being included in a corresponding drain value set among a plurality of drain value sets, and
wherein the drain path selection circuit selects at least one output drain path among a plurality of output drain paths and outputs the drain values only to the selected at least one output drain path.

2. The calculation circuit according to claim 1,
wherein the plurality of MAC circuits comprises a first MAC circuit and a second MAC circuit,
wherein the drain path selection circuit comprises a selection circuit, a first drain value storage circuit, and a second drain value storage circuit,
wherein the second drain value storage circuit stores a second drain value from the second MAC circuit and outputs the second drain value to the selection circuit, in response to a control signal,
wherein the selection circuit outputs a first drain value from the first MAC circuit to the first drain value storage circuit and outputs the second drain value from the second drain value storage circuit to the first drain value storage circuit, and
wherein the first drain value storage circuit stores a drain value from the selection circuit and outputs the drain value to one of the selected at least one output drain path.

3. The calculation circuit according to claim 2,
wherein a first calculator group is coupled to a second calculator group at the same row in the data propagation direction, and
the selection circuit is coupled to an output drain path of the second calculator group, and receives one or more subsequent drain values from the output drain path of the second calculator group.

4. The calculation circuit according to claim 1, wherein a first calculator group comprises:
a data value storage circuit coupled to the plurality of MAC circuits in common,
wherein the data value storage circuit receives the data value included in the data value set from the input data path, stores the data value therein, and outputs stored data value to the plurality of MAC circuits and an output data path.

5. The calculation circuit according to claim 4,
wherein the first calculator group is coupled to a second calculator group at the same row in the data propagation direction, and
wherein the output data path is coupled to an input data path of the second calculator group.

6. The calculation circuit according to claim 4, wherein the first calculator group further comprises:
a plurality of weight value storage circuits respectively coupled to the plurality of MAC circuits,
wherein the plurality of weight value storage circuits receive weight values respectively included in weight value sets from input weight paths, store the weight values therein, and output stored weight values to the plurality of MAC circuits and output weight paths.

7. The calculation circuit according to claim 6,
wherein the first calculator group is coupled to a third calculator group at the same column in a weight propagation direction, and
the output weight paths are coupled to input weight paths of the third calculator group.

8. A deep learning system comprising:
a plurality of calculator groups constituting a systolic array composed of a plurality of rows and a plurality of columns; and
a plurality of activation groups respectively corresponding to the plurality of rows,
wherein calculator groups included in each row of the plurality of rows receives a same data value set,
wherein each calculator group of the calculator groups included in the each row generates a plurality of drain values in parallel, each of the plurality of drain values being included in a corresponding drain value set among a plurality of drain value sets,
wherein the each calculator group comprises a drain path selection circuit, and the drain path selection circuit selects at least one output drain path among a plurality of output drain paths and outputs the plurality of drain values only to the selected at least one output drain path, and
wherein each activation group, corresponding to the each row, of the plurality of activation groups receives the plurality of drain value sets and performs a plurality of activation function calculations based on the plurality of drain value sets.

9. The deep learning system according to claim 8, wherein the activation function calculations are calculations of an LSTM (Long Short-Term Memory) network.

10. The deep learning system according to claim 8, wherein the calculator groups included in the each row propagate the data value set in a data propagation direction.

11. The deep learning system according to claim 8, wherein calculator groups included in each column of the plurality of columns propagate a plurality of weight value sets in a weight propagation direction in parallel.

* * * * *